(12) United States Patent
Imai

(10) Patent No.: US 10,389,653 B2
(45) Date of Patent: Aug. 20, 2019

(54) REQUEST DISTRIBUTION SYSTEM, MANAGEMENT SYSTEM, AND METHOD FOR CONTROLLING THE SAME

(71) Applicant: CANON KABUSHIKI KAISHA, Tokyo (JP)

(72) Inventor: Kazuo Imai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 15/144,472

(22) Filed: May 2, 2016

(65) Prior Publication Data

US 2016/0337263 A1    Nov. 17, 2016

(30) Foreign Application Priority Data

May 14, 2015   (JP) ................................ 2015-099469

(51) Int. Cl.
*G06F 15/173* (2006.01)
*H04L 12/911* (2013.01)
*H04L 12/947* (2013.01)
*H04L 29/08* (2006.01)

(52) U.S. Cl.
CPC ............ *H04L 47/827* (2013.01); *H04L 49/25* (2013.01); *H04L 67/1004* (2013.01); *H04L 67/2814* (2013.01)

(58) Field of Classification Search
CPC ....... H04L 47/827; H04L 49/25; H04L 41/12; H04L 67/325; H04L 67/2814; H04L 67/1004; H04L 12/911; H04L 12/24; H04L 29/08; H04L 12/947
See application file for complete search history.

(56) References Cited

U.S. PATENT DOCUMENTS

| | | | |
|---|---|---|---|
| 8,244,874 B1 * | 8/2012 | Thireault | G06F 9/5055 709/226 |
| 9,647,889 B1 * | 5/2017 | Jones | G06F 9/547 |
| 2002/0052909 A1 * | 5/2002 | Seeds | G06F 9/5055 718/104 |

(Continued)

FOREIGN PATENT DOCUMENTS

JP        2013-543171 A    11/2013

*Primary Examiner* — Cheikh T Ndiaye
(74) *Attorney, Agent, or Firm* — Canon U.S.A., Inc. IP Division

(57) ABSTRACT

A request distribution system connected with a first and second processing system to adjust resources for use in request processing according to a received request amount includes a reception unit that receives a request, and a determination and a transmission unit. The determination unit determines a processing system as a transmission destination. The transmission unit transmits the request to the determined processing system. When a processing system for processing a request from a predetermined network system is switched from the first to the second processing system, the determination unit determines the first and second processing systems as respective transmission destinations so that the requests are distributed to the first and second processing systems between a start and end of the switching. When the second processing system is determined as the transmission destination per the amount of requests, resources to be used in the second processing system request processing are adjusted.

18 Claims, 18 Drawing Sheets

(56) References Cited

U.S. PATENT DOCUMENTS

| | | | | |
|---|---|---|---|---|
| 2007/0198721 A1* | 8/2007 | Ikawa | ................... | G06Q 30/00 709/226 |
| 2008/0244552 A1* | 10/2008 | Toeroe | ..................... | G06F 8/60 717/168 |
| 2010/0058342 A1* | 3/2010 | Machida | ............... | G06F 9/5077 718/1 |
| 2012/0233313 A1* | 9/2012 | Fukami | ................ | G06F 9/5072 709/224 |
| 2012/0284296 A1* | 11/2012 | Arifuddin | ........... | H04L 67/1027 707/769 |
| 2014/0379901 A1* | 12/2014 | Tseitlin | .................. | H04L 43/08 709/224 |
| 2015/0379296 A1* | 12/2015 | Chang | .............. | G06F 17/30345 707/785 |

* cited by examiner

EXAMPLES OF SCREENS OFFERED TO CUSTOMER MANAGER

EXAMPLE OF SCREEN OFFERED TO CUSTOMERS

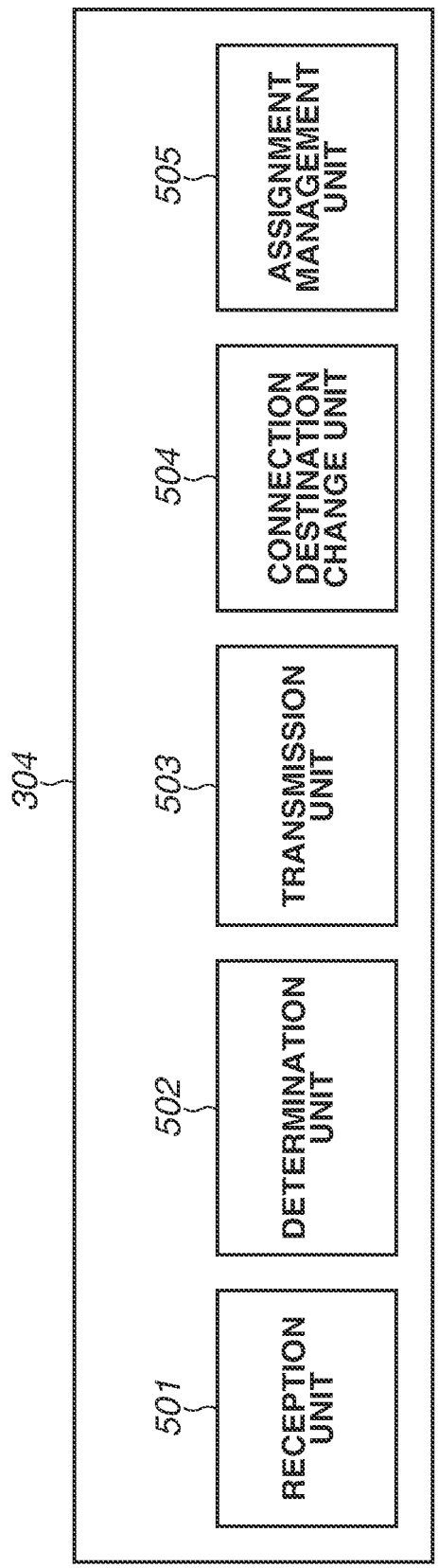

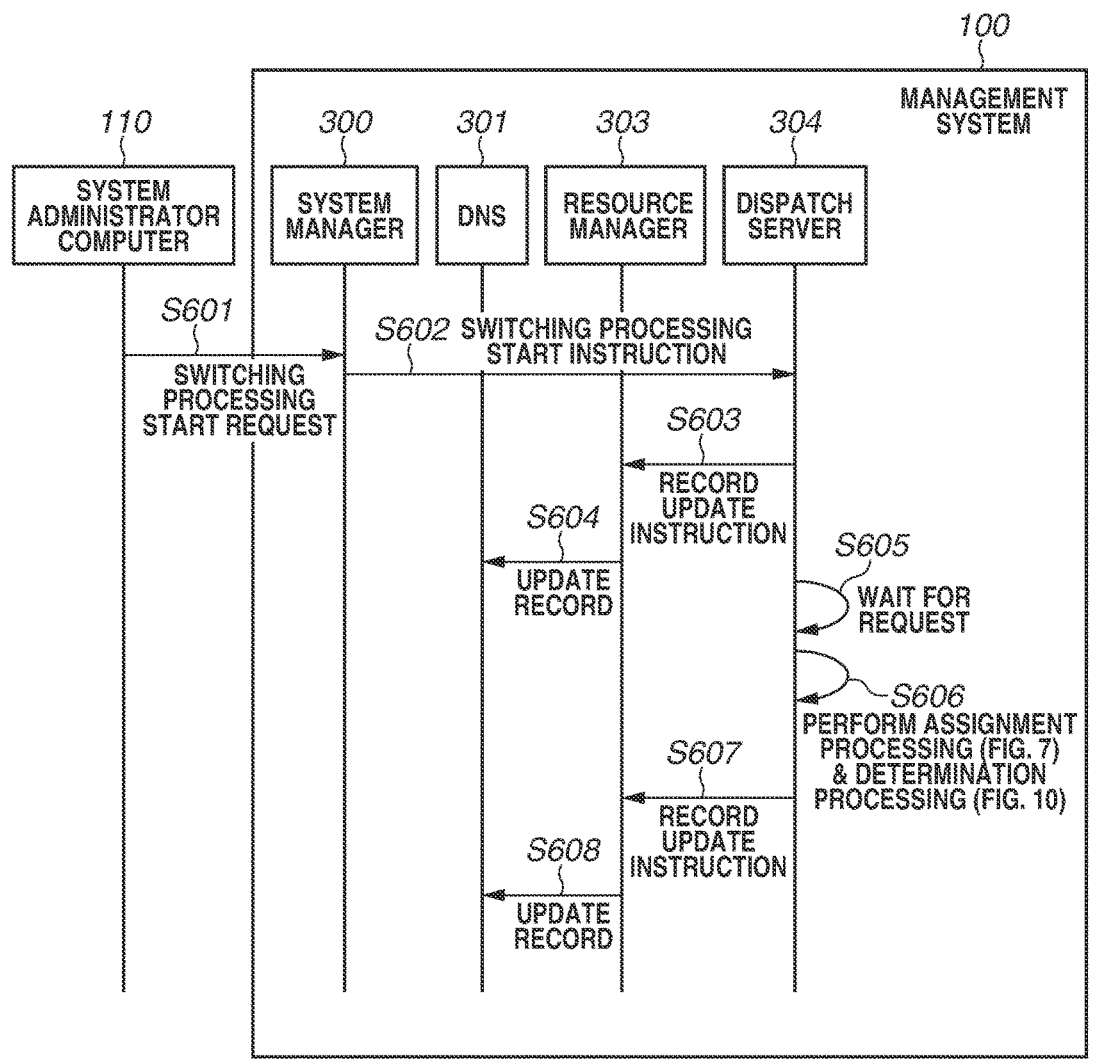

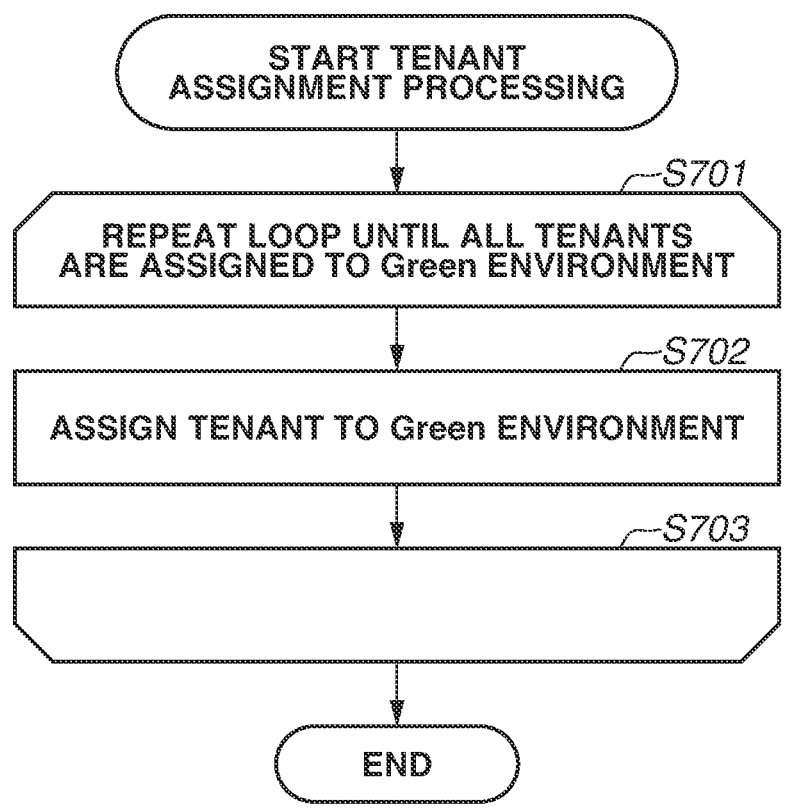

| TENANT ID |
|---|
| SP_US ~801 |
| ABC_Corp ~802 |
| SP_UK ~803 |
| ABC_US ~804 |
| ABC_ASIA ~805 |

| TENANT ID |
|---|
| SP_UK ~811 |
| SP_London ~812 |
| SP_US ~813 |
| ABC_Corp ~814 |
| ABC_US ~815 |
| ABC_ASIA ~816 |
| BBB_HQ ~817 |
| ⋮ |

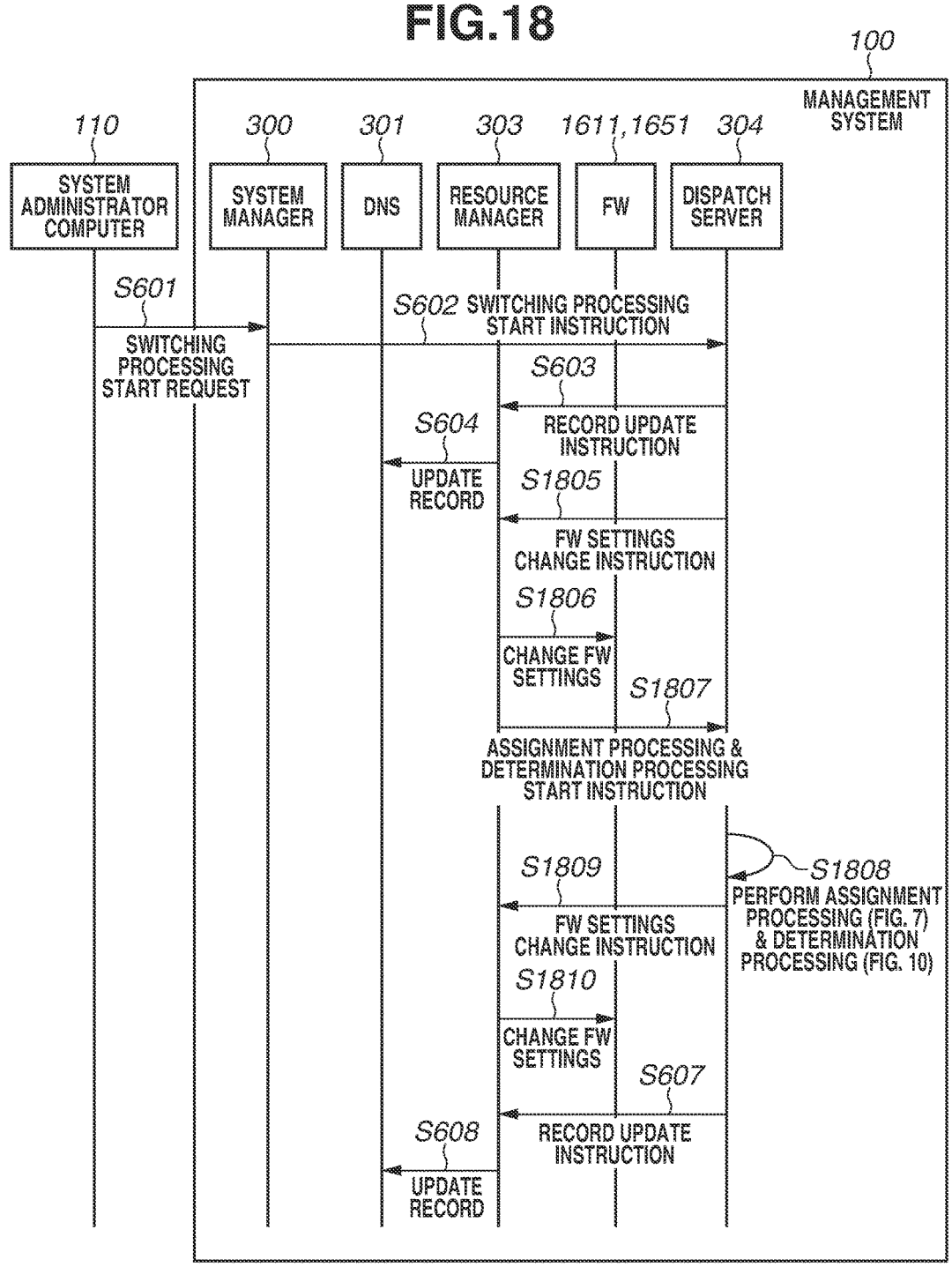

REQUEST DISTRIBUTION SYSTEM, MANAGEMENT SYSTEM, AND METHOD FOR CONTROLLING THE SAME

BACKGROUND OF THE INVENTION

Field of the Invention

The present invention relates to a technique for distributing requests in a processing system during processing system switching.

Description of the Related Art

In recent years, cloud services have emerged as services for enabling the use of diverse applications operating on servers on the Internet. In such cloud services as Infrastructure as a Service (IaaS) and Platform as a Service (PaaS), a cloud service vendor provides a system administrator with resources such as virtual machines and storages via networks. A virtual machine refers to some partition or segment of a server divided or integrated in logical units regardless of the physical configuration by using virtualization technology. Each virtual machine serves as a logical computer operating based on an independent operating system. The system administrator is able to configure a system for offering original services by using virtual machines, storages, and other resources offered by the cloud service vendor.

According to system administrator's arbitrary settings, a system configured based on cloud services is capable of automatically adjusting resources depending on the amount of requests to be received and the load for processing these requests. For example, Japanese Unexamined Patent Application Publication (Translation of PCT Application) No. 2013-543171 discusses an auto-scale function of automatically assigning computing resources required for program execution, starting program execution, and then changing the assigned resources.

Such resource adjustment processing is performed by a resource manager offered by cloud services. The amount of requests refers to the number of requests to be received in a unit time by a load balancer in a system configured based on cloud services. The load for processing, i.e., a load on processing by a virtual machine, refers to the usage rate of a central processing unit (CPU) by the virtual machine, the memory usage rate, and the response time. The resource adjustment processing includes "scale-out" for increasing the number of virtual machines, and "scale-up" for increasing hardware resources to be assigned to virtual machines. The resource adjustment processing further includes "scale-in" for reducing the number of virtual machines, and "scale-down" for reducing hardware resources to be assigned to virtual machines. Hardware resources include CPUs, memories, storages. The load balancer is also capable of automatically performing scale-out based on the amount of requests to be received.

In recent years, when upgrading the above-described system configured based on cloud services, a technique called "Blue-Green deployment" may be used. The system upgrade includes, for example, the upgrade of applications executed on virtual machines in the system. In the system after upgrade, providable functions may be increased, and the type and format of management data may be changed.

Blue-green deployment is a release technique that reduces downtime and risk by running two identical production environments called Blue and Green. At any time, only one of the environments is live, with the live environment serving all production traffic. The Blue-Green deployment technique will be described below.

On cloud services, a processing system is operating as a released production environment for receiving requests from external networks and performing processing thereof. When the processing system is to be upgraded, the technique further configures on cloud services a processing system after upgrade, different from the processing system of the current version. Then, when the upgrade timing comes, the technique changes the setting of a connection destination (indicating a transmission target) of requests from external networks on cloud services, and switches a processing system to be the released production environment. In this case, the technique switches the released production environment to the processing system after upgrade. This switching achieves the system upgrade.

In this case, the processing system on which the above-described system of the current version operates, i.e., the processing system before switching is referred to as a Blue environment. On the other hand, the processing system on which the above-described system after upgrade is configured, i.e., the processing system after switching is referred to as a Green environment. Hereinafter, in some cases, the Blue environment may be referred to as a first processing system, and the Green environment may be referred to as a second processing system.

The processing system switching based on the Blue-Green deployment technique may also be used for other than the above-described system upgrade. For example, the technique is used for a case where a request processing environment is switched from a processing system (first processing system) having a failure or bug to another processing system (second processing system) normally operating.

The above-described system may be scheduled, for example, to be upgraded several times a day. Taking the transition in the amount of requests into consideration, such a system has difficulty in performing the above-described processing system switching because the next upgrade time is close. Further, in some cases, the release date of a system of a new version cannot be largely shifted to a subsequent date because of system operations. Therefore, even when the first processing system is receiving a large number of requests from an external network and therefore is subjected to a large processing load, it may be necessary to start processing for switching the processing system for processing these requests aiming for the upgrade.

When the first processing system is subjected to a large load on request-related processing, the above-described resource manager performs resource adjustment processing so that a large amount of resources are offered to the load balancer for processing requests within the first processing system. On the other hand, the second processing system prepared for processing system switching for upgrade has not yet received and processed a request from an external network, and therefore the resource manager has not completed the resource adjustment processing. When the system administrator considers the saving of the system maintenance cost, the second processing system prepared in advance may be configured with a comparatively small amount of resources. When the above-described system switching processing is performed under such a situation, the second processing system will receive a large number of requests at one time. In this case, if the resource adjustment processing by the resource manager is slow, request processing by the second processing system may possibly be stagnated.

SUMMARY OF THE INVENTION

According to an aspect of the present invention, a request distribution system connected with a first processing system and a second processing system and capable of adjusting resources to be used in request processing according to an amount of requests received includes a reception unit configured to receive a request, a determination unit configured to determine a processing system as a transmission destination of the request received by the reception unit, and a transmission unit configured to transmit the request received by the reception unit to the processing system determined by the determination unit, wherein, when a processing system for processing a request from a predetermined network system is switched in a switching from the first processing system to the second processing system, the determination unit determines the first and the second processing systems as respective transmission destinations of a plurality of requests so that the plurality of requests received by the reception unit is distributed to the first and the second processing systems during a time period between a start and an end of the relevant switching, and wherein, when the transmission destination is determined to be the second processing system by the determination unit according to the amount of requests, resources to be used in request processing by the second processing system are adjusted.

Further features of the present invention will become apparent from the following description of exemplary embodiments with reference to the attached drawings.

BRIEF DESCRIPTION OF THE DRAWINGS

FIG. 5 is a block diagram illustrating an example of a software module configuration of a dispatch server.

FIG. 6 is a sequence diagram illustrating an example of processing system switching processing.

FIG. 7 is a flowchart illustrating an example of tenant assignment processing.

FIGS. 8A and 8B are tables illustrating examples of tenant management tables managed by the dispatch server.

FIG. 18 is a sequence diagram illustrating an example of processing system switching processing.

DESCRIPTION OF THE EMBODIMENTS

Exemplary embodiments of the present invention will be described below with reference to the accompanying drawings.

The exemplary embodiments will be described below based on an example of a management system as a network system configured by using cloud services. The management system manages network devices owned by a plurality of customers from a remote location via networks. The management system collects apparatus information and operation information (log information, failure information, etc.) from network devices existing in each customer network environment and analyzes the information to offer diverse device management services. More specifically, the management system offers a service of reporting the operation status of a network device and a service required to maintain a defective network device. To offer these services, for example, the management system is configured to receive a request for registering a new management target network device, a request for generating a report, a request for registering log information of a network device, etc., via a network.

In some cases, customers consign the management of their devices to a customer manager. In this case, the customer manager manages devices owned by each customer and provides the customer with various services by using the management system. Users of the management system include the customer manager and customers.

Figure 1:
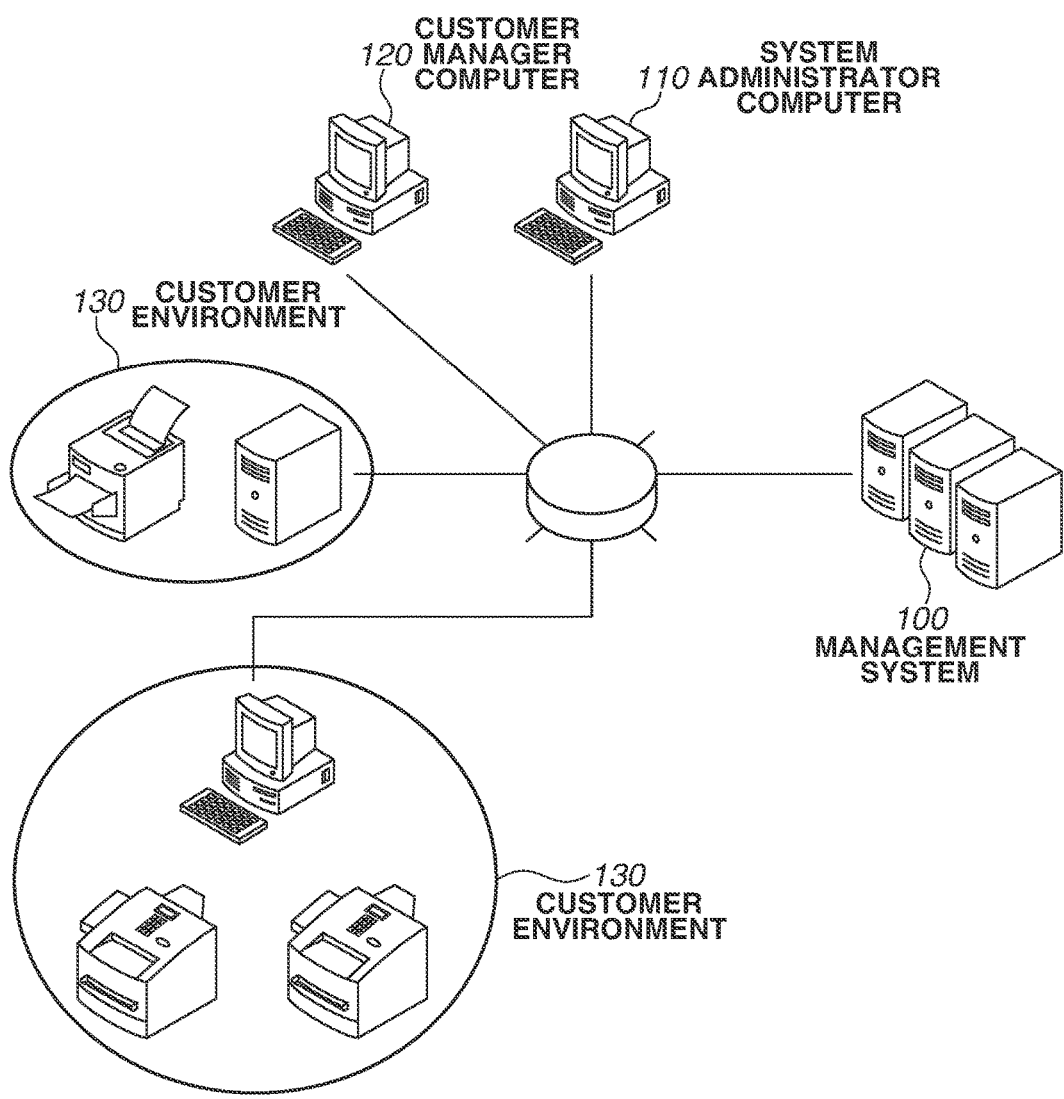
FIG. 1 is a diagram illustrating an overview of a system configuration according to an exemplary embodiment of the present invention.

FIG. 1 is a diagram illustrating an overview of a configuration of the entire management system. Via the Internet, a management system 100 for managing network devices and customer information is connected with a plurality of customer environments 130 where network devices are installed. A system administrator computer 110 for managing the management system 100 and a computer for a person in charge in a network device sales company (hereinafter, referred to as a customer manager computer 120) are similarly connected with the management system 100 via the network.

The management system 100 is a system for offering services for managing network devices and customers holding the network devices. The management system 100 is configured by using platforms and resources offered by using cloud services such as IaaS and PaaS. As resources, cloud services offer, for example, a plurality of virtual machines and storages operating on server computers existing in a data center on the Internet. Executing various application programs on a plurality of virtual machines implements diverse management services as the management system 100. More specifically, there are various service contents. A certain cloud service collects apparatus information of network devices installed in a customer environment 130, and associates the apparatus information with the customer information. Another cloud service collects operation information such as log information and failure information of network devices installed in the customer environment 130, analyzes the information, and generates a report for a customer or a person in charge in a sales company. Still another cloud service notifies a person in charge in a sales company of information required for the maintenance of a defective network device by using E-mail. Network devices include printers, network cameras, and other image processing apparatuses. Printers include electrophotographic printers using toner and ink-jet printers using ink. The management system 100 is also capable of collecting type-specific operation information (e.g., the amount of consumed toner and the amount of consumed ink) and offering different management services.

The system administrator computer 110 is used by a system administrator, and is able to display management screens for the system administrator offered by the management system 100 by using an installed web browser. The system administrator can make an instruction to transmit a request for performing various settings on the management system 100 via the management screens displayed on the system administrator computer 110. For example, the system administrator can make an instruction to transmit a request for generating a Green environment for the above-described Blue-Green deployment and a request for switching the request processing system from a Blue environment to the Green environment.

The customer manager computer 120 is used by a person in charge in a network device sales company, and is able to display screens for a person in charge offered by the management system 100 by using a web browser. The screens for a person in charge offered by the management system 100 include a screen for confirming operation information such as log information and failure information of a network device installed in the customer environment 130. Further, as a screen for a person in charge, the customer manager computer 120 is also able to display a screen for performing monitoring setting for the network device installed in the customer environment 130.

A customer environment 130 refers to a network environment existing on the network for each of customers managed by the management system 100. Via a local area network (LAN), the customer environment 130 is connected with one or more network devices and a relay apparatus for relaying communication between each network device and the management system 100. The relay apparatus has functions of searching for a network device on the network and, when the network device is found, generating a request for notifying the management system 100 of apparatus information of the network device, and transmitting the request to the management system 100. The relay apparatus also has functions of generating a request for notifying the management system 100 of operation information collected from a network device, and transmitting the request to the management system 100.

Figure 2:
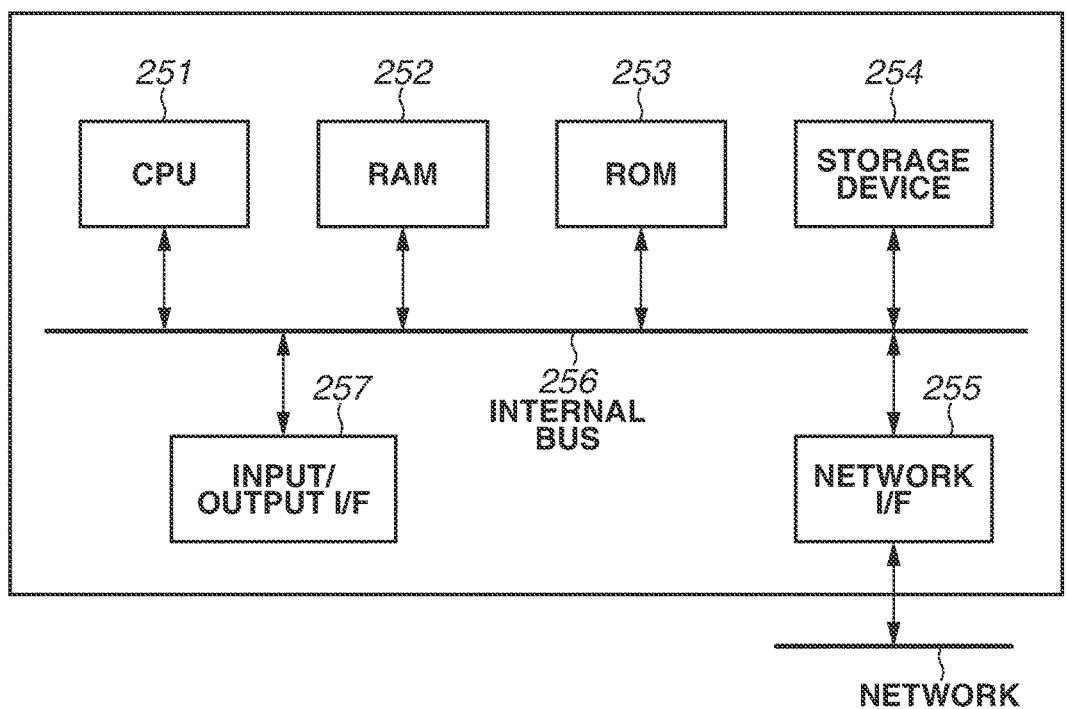
FIG. 2 is a block diagram illustrating an example of a hardware configuration of an information processing apparatus.

FIG. 2 illustrates an example of a hardware configuration of an information processing apparatus. Information processing apparatuses according to the present exemplary embodiment include server computers and the computers 110 and 120 existing in a data center for implementing the management system 100, and computers as relay apparatuses existing in the customer environments 130.

An information processing apparatus includes a central processing unit (CPU) 251 for executing a program stored in a read only memory (ROM) 253, and integrally controls each device via an internal bus 256. A random access memory (RAM) 252, the ROM 253, a storage device 254, a network interface (I/F) 255, and an input/output I/F 257 are connected to the internal bus 256. The input/output I/F 257 includes, for example, a PS/2 connector, a universal serial bus (USB) I/F, and an analog/digital display I/F. The input/output I/F 257 enables a keyboard, a mouse, a cathode ray tube (CRT) display, a liquid crystal display, etc. (not illustrated) to be connected to the information processing apparatus. The network I/F 255 enables the information processing apparatus to perform communication via the LAN, an intranet environment, and the Internet. Thus, the information processing apparatus is able to communicate with network devices and other information processing apparatuses. The CPU 251 performs processing for executing a program together with the RAM 252 and the ROM 253. Further, the CPU 251 is able to execute a program for implementing virtualization technology. Further, the CPU 251 performs processing for recording data on a recording medium such as the storage device 254. The storage device 254 functions as an external storage to store various information, and is able to store various system information and processing information instead of the RAM 252.

Figure 3A:
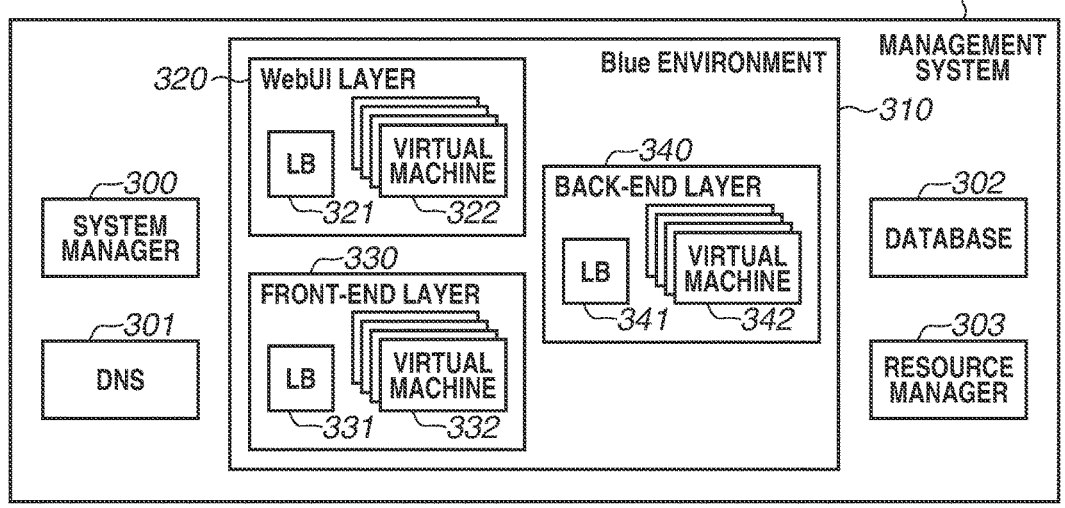
FIGS. 3A and 3B are block diagrams illustrating configurations of a management system.
Figure 3B:
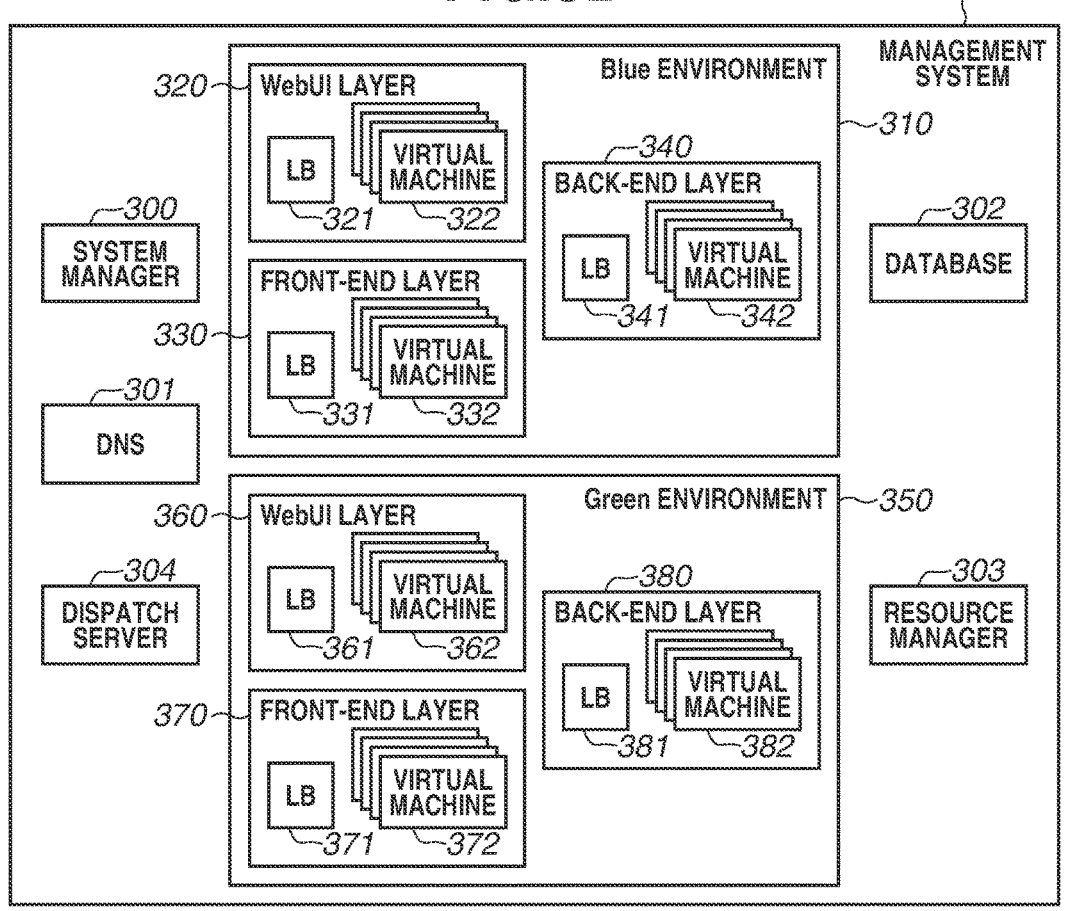

FIGS. 3A and 3B are diagrams illustrating configurations of the management system 100. The management system 100 is a system for offering services for managing network devices configured by using resources offered based on cloud services and customers who holds the network devices. FIG. 3A illustrates an example of a configuration of the management system 100 including a Blue environment 310 as a processing system that is currently receiving and processing requests from predetermined network systems (e.g., the customer manager computer 120, and the customer environments 130) outside the management system 100. FIG. 3B illustrates an example of a configuration of the management system 100 after a Green environment 350 is further generated in the configuration illustrated in FIG. 3A as a processing system different from the Blue environment 310.

The management system 100 illustrated in FIG. 3A includes a system manager 300, a domain name system (DNS) 301, a database 302, a resource manager 303, and the Blue environment 310.

The Internet Protocol (IP) address and the host name of each virtual machine and a load balancer (LB) are registered in the DNS 301. The system administrator computer 110, the customer manager computer 120 and computers and network devices in the customer environments 130 communicate with the DNS 301 via networks such as the Internet. The above-described computers and network devices make an inquiry to the DNS 301 about the IP address corresponding to the host name of each LB in the processing system as the connection destination of a request, and send the request to the IP address returned from the DNS 301. Upon receiving the request, the DNS 301 returns the host name or IP address indicating each LB in the processing system as the connection destination of the request by using a DNS record associated with the DNS name. Each of virtual machines configuring the management system 100 has a unique IP address. Therefore, the IP address of each virtual machine configuring a load balancer may identify the IP address of the relevant load balancer.

The database 302 stores programs for implementing the present management system and various data for offering services to the customer manager. The management system 100 according to the present exemplary embodiment manages information about the customer manager and customers based on tenants, i.e., dedicated storage areas in the database 302. When a customer accesses information managed by the management system 100, the customer can access data of only a tenant to which the customer belongs, and is limited in accessing other tenants. On the other hand, under the customer manager's authority, the customer manager can access not only data of a tenant to which the customer manager belongs but also data of tenants of one or more customers who own management target network devices. The management system 100 provides the customer manager with an access method (not illustrated) which needs the approval from each customer. By using this access method, the customer manager can access data stored in the tenant of the customer. For example, the customer manager can access the tenant of a customer via a management screen displayed on the customer manager computer 120, and transmit a request of instruction to update setting information for managing devices of the customer.

The system manager 300 receives a request relating to the setting of a processing system in the management system 100 from the system administrator computer 110. Based on the received request, the system manager 300 instructs the resource manager 303 to generate resources for configuring a processing system and generating the processing system by using the resources and to adjust the resources in the management system 100. The system manager 300 receives a request for updating a DNS record registered in the DNS 301 from the system administrator. Based on the received request, the system manager 300 instructs the resource manager 303 to update the relevant DNS record registered in the DNS 301. After receiving a request for starting processing system switching processing, the system manager 300 can instruct a dispatch server 304 to start tenant assignment processing. The tenant assignment processing will be described below with reference to FIG. 7.

The resource manager 303 generates resources for configuring a processing system and adjusts the resources in the management system 100 according to an instruction of the system manager 300. A request sent from the system administrator to the system manager 300 requests the resource manager 303, for example, to perform scale-out of virtual machines in the Blue environment 310 to enable resource adjustment. Further, the resource manager 303 is able to monitor the amount of requests to the Blue environment 310 to automatically adjust resources.

The resource manager 303 updates the DNS record registered in the DNS 301 according to a request received by the system manager 300. This changes the connection destination of requests from the customer manager computer 120 and computers and network devices in the customer environments 130.

In addition to the above-described method, there are some methods for changing the connection destination of requests, for example, a method of preparing a load balancer and a reverse proxy as an access point and a method of updating the universal resource locator (URL) for accessing the system.

A processing system generated in the management system 100 is configured with a plurality of layers where various kinds of processing for requests are performed. Each layer includes a virtual machine group and a load balancer. The plurality of layers includes a WebUI layer, a front-end layer, and a back-end layer. The WebUI layer receives and processes requests from the customer manager computer 120 and computers in the customer environments 130, and provides these computers with a graphical user interface (GUI). The front-end layer receives and processes requests from a relay apparatus and network devices in the customer environments 130. The back-end layer receives and processes requests having undergone processing in the front-end layer. The back-end layer may include a batch processing unit for processing queue messages, operating asynchronously with the front-end layer.

The Blue environment 310 includes a web user interface (WebUI) layer 320 including an LB 321 and virtual machines 322, a front-end layer 330 including an LB 331 and virtual machines 332, and a back-end layer 340 including an LB 341 and virtual machines 342. The Blue environment 310 is a released production environment that is currently receiving and processing requests from predetermined network systems. The predetermined network systems include, for example, the customer manager computer 120 and the customer environments 130 (i.e., computers and network devices in the customer environments 130).

The WebUI layer 320 processes requests received from the customer manager computer 120 and computers in the customer environments 130 by using the virtual machines 322. The processing includes processing for offering various screens via web browsers on the customer manager computer 120 and computers in the customer environments 130. The virtual machines 322 are a group of one or more virtual machines that function as web servers for processing requests from the customer manager and customers. A web server has a function of offering the above-described various screens to web browsers on computers connected via networks. The screens offered to web browsers will be described below with reference to FIGS. 4A and 4B. Example requests from the customer manager computer 120 include a request for registering a new management target network device and a request for generating a report. Example requests from computers in the customer environments 130 include a request for downloading a report generated by the customer manager.

Figure 4A:
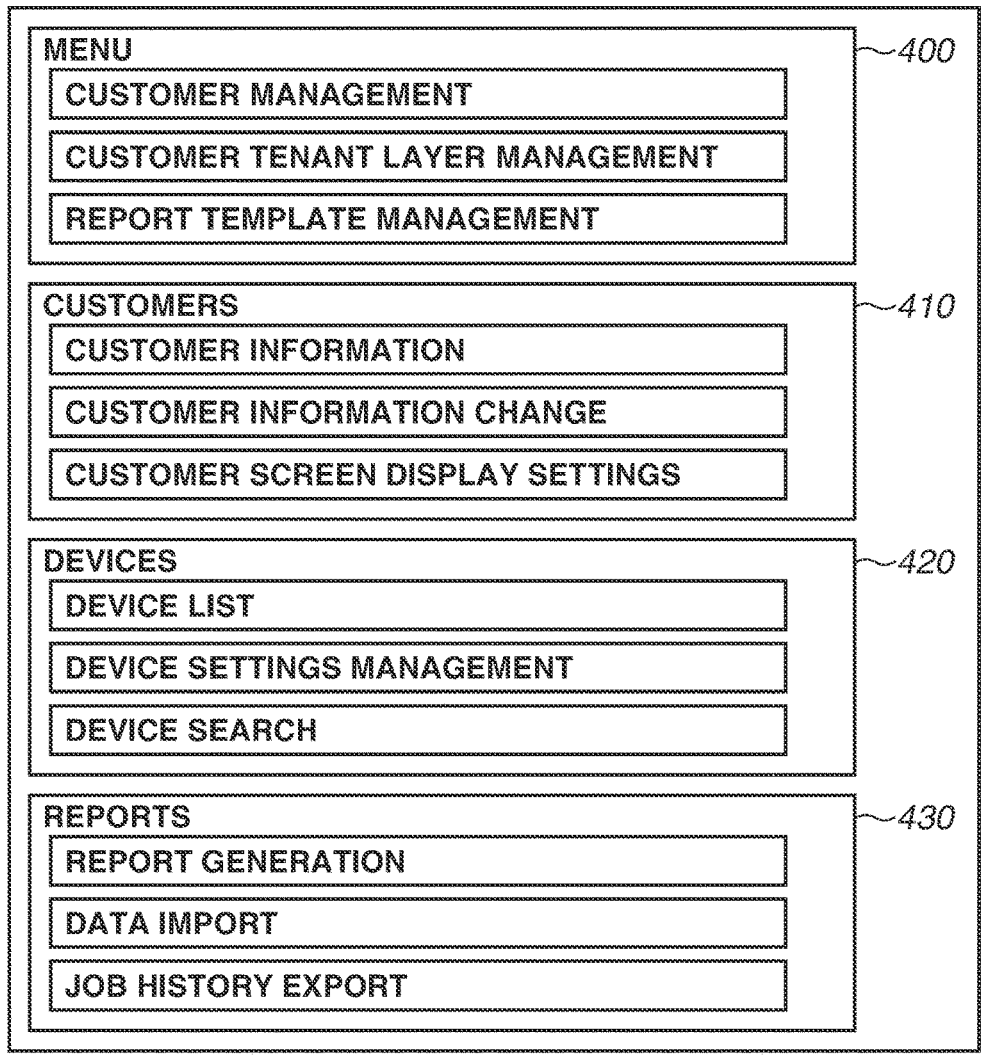
FIGS. 4A and 4B are diagrams illustrating examples of screens provided for a customer manager computer and computers in a customer environment.
Figure 4B:
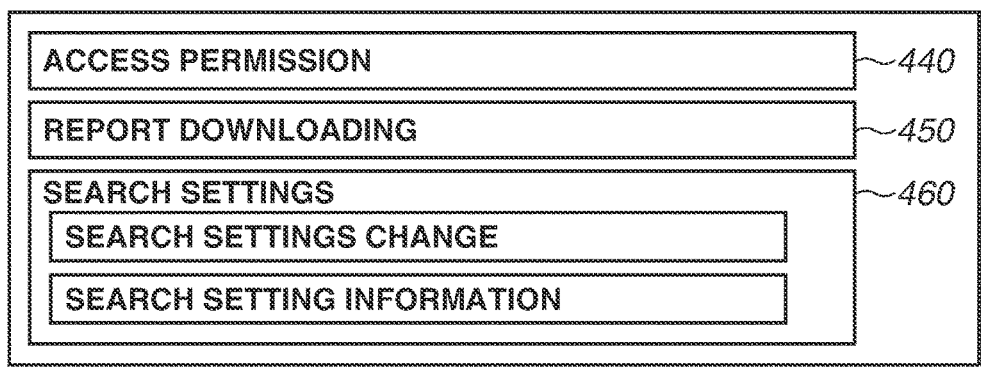

FIGS. 4A and 4B illustrate examples of display contents to be offered to the customer manager computer 120 and computers in the customer environments 130.

FIG. 4A illustrates an example of a screen displayed on the customer manager computer 120. The GUIs illustrated in FIG. 4A are offered by processing in the WebUI layer 320. Items 400 to 430 are displayed as display contents. The customer manager is allowed to select, for example, an item included in "Customers" settings 410, and change and refer to information of a management target customer. The customer manager is also allowed to select an item included in "Devices" settings 420, and change and refer to the search setting of a device owned by the management target customer. The customer manager further is allowed to select an item included in "Reports" settings 430, and make an instruction to generate a report by using operation information of a device owned by the management target customer.

FIG. 4B illustrates an example of a screen displayed on computers in the customer environments 130. Such a GUI is offered to computers in the customer environments 130 by the processing in the WebUI layer 320. Items 440 to 460 are displayed on the screen of computers in the customer environments 130. For example, a customer can select an item indicated in search setting information in the "Search Settings" 460, and refer to the search settings of a device owned by the customer.

Referring back to FIGS. 3A and 3B, the front-end layer 330 processes requests received from computers and network devices in the customer environments 130 by using the virtual machines 332. The virtual machines 332 are a group of virtual machines for processing requests from network devices in the customer environments 130. Example requests processed in the front-end layer 330 include a request for registering log information of a network device.

The back-end layer 340 processes requests received through the processing in the WebUI layer 320 or the front-end layer 330 by using the virtual machines 342. The back-end layer 340 may include a batch processing unit asynchronously executed with the processing in the WebUI layer 320 or the front-end layer 330. The batch processing unit performs, for example, total processing of log information received via the front-end layer 330 and storing the result in the database 302.

The LBs 321, 331 and 341 distribute received requests to the virtual machines 322, 332, and 342 in respective layers.

FIG. 3B illustrates a configuration in which the dispatch server 304 and the Green environment 350 are added to the configuration of the management system 100 illustrated in FIG. 3A. The Green environment 350 is a processing system prepared as a processing system different from the Blue environment 310. The dispatch server 304 (described in detail below) is a request distribution system configured to distribute requests from external networks to the Blue environment 310 and the Green environment 350.

The system administrator computer 110 sends a request for generating the Green environment 350 to the system manager 300. Upon reception of the request from the system administrator computer 110, the system manager 300 issues an instruction for generating the Green environment 350 to the resource manager 303. Upon reception of the instruction from the system manager 300, the resource manager 303 generates the Green environment 350. While the Blue environment 310 offers services by using applications of the current versions, the Green environment 350 offers services by using applications of upgraded versions. For example, the number of services offered and the number of types of managed data are increased, and data formats managed by the database 302 are changed depending on applications operating in the Green environment 350.

The Green environment 350 includes a WebUI layer 360 including an LB 361 and virtual machines 362, a front-end processing unit 370 including an LB 371 and virtual machines 372, and a back-end processing unit 380 including an LB 381 and virtual machines 382. Upgraded versions of applications operating on the virtual machines 322, 332, and 342 in the Blue environment 310 are operating on at least a part of the virtual machines 362, 372, and 382 in the Green environment 350. Also, for the Green environment 350, the resource manager 303 is able to monitor the amount of requests and automatically adjust resources. The LBs 361, 371, and 381 distribute received requests to the virtual machines 362, 372, and 382 in respective layers.

When the system administrator generates a Green environment, the system administrator configures the Green environment by using as small number of virtual machines as possible in consideration of cost saving in many cases. A plurality of Green environments may exist in the management system 100. When switching the processing system as the connection destination of requests from the outside of the management system 100, the system administrator can select an arbitrary Green environment as a target processing system.

Functions of the dispatch server 304 are implemented on a processing system including one or more virtual machines. These virtual machines are generated in a similar procedure to the Green environment 350. The system administrator computer 110 sends a request for generating the dispatch server 304 to the system manager 300. Upon reception of the request from the system administrator computer 110, the system manager 300 issues an instruction for generating the dispatch server 304 to the resource manager 303. Upon reception of the instruction from the system manager 300, the resource manager 303 generates the dispatch server 304. Under a certain condition, the system administrator may automatically configure a dispatch server when generating the Green environment 350.

The dispatch server 304 receives requests from the customer manager computer 120 and computers and network devices in the customer environments 130. Subsequently, the dispatch server 304 determines the Blue environment 310 or the Green environment 350 as the transmission destination of the request, and transmits the request to the determined processing system. Upon reception of an instruction from the system manager 300, the dispatch server 304 updates the DNS record registered in the DNS 301. The dispatch server 304 further performs the tenant assignment processing for gradually determining a tenant with which a request should be processed in the Green environment 350. The dispatch server 304 also manages tenant information as a result of the tenant assignment processing. Processing performed by the dispatch server 304 enables preventing the stagnation of the request processing in the Green environment 350 at the time of the processing system switching.

Processing performed by the dispatch server 304 will be further supplemented.

By using identification information included in a request, the dispatch server 304 performs determination processing for determining a processing system as the transmission destination of the request. More specifically, upon reception of a request, the dispatch server 304 performs determination processing so that the request is to be processed by a processing system to which the tenant of the system user corresponding to the requestor of the relevant request is assigned.

However, if a plurality of requests in dependency relations is respectively distributed to the Blue environment 310 and the Green environment 350 and processed in the two different environments, a failure may occur in request processing in the subsequent stage. A plurality of requests in dependency relations refers to requests identified to be associated with each other according to requestors and processing content of the requests.

Failures in processing of a plurality of requests in such dependency relations will be described below.

In the present exemplary embodiment, the Blue environment 310 and the Green environment 350 share the database 302. Therefore, data updated by a request processed in the Green environment 350 will be referenced by a request processed in the Blue environment 310. In this case, in the Blue environment 310 where applications of earlier versions are operating, results of processing performed by the Green environment 350 may not normally be referenced.

More specifically, suppose a case where a first request is processed in the Green environment 350 where the management system 100 after upgrade is operating. For example, based on a transmission request specified by the customer manager, the dispatch server 304 updates tenant information of customers managed by the customer manager with data in a format unsupported by the Blue environment 310. Subsequently, a second request is processed in the Blue environment 310 where the processing system before upgrade is operating. For example, based on a transmission request specified by a customer, the dispatch server 304 refers to the data updated by the first request. In such a case, since the processing result data (e.g., type, format) in the Green environment 350 is unsupported by the Blue environment 310, the second request cannot be suitably processed in the Blue environment 310.

To solve this abnormal state, the dispatch server 304 also uses identification information of other than the requestor included in a request to determine a processing system as the transmission destination of the request. In the present exemplary embodiment, upon reception of a request, the dispatch server 304 checks not only information indicating the tenant corresponding to the requestor of the request but also information indicating tenants relating to other users. For example, a request with which the customer manager instructs the processing system to change the setting of a specific customer includes not only information indicating the tenant of the customer manager as information of a requestor but also information indicating the tenant of the relevant customer who manages change target information. When the request includes information indicating a plurality of tenants, the dispatch server 304 determines a processing system as the transmission destination of the request in consideration of processing systems to which the plurality of tenants is respectively assigned. This determination processing will be described in detail below with reference to FIG. 10.

The identification information of other than the requestor is not limited to information indicating the tenants relating to other users, used in the present exemplary embodiment. For example, the identification information of other than the requestor may be a part of information indicating the processing target or processing content included in the request.

The present exemplary embodiment is applicable even to a case where each processing system has a database. The reason is that, when a request is processed by different processing systems, data update is reflected only to one database causing inconsistency of data.

In the present exemplary embodiment, a solution for failures resulting from a plurality of requests as described above in processing for distributing requests to a plurality of processing systems not only with the Blue-Green deployment but also with the dispatch server 304.

FIG. 5 is a block diagram illustrating an example of a software module configuration of the dispatch server 304. The dispatch server 304 includes a reception unit 501, a determination unit 502, a transmission unit 503, a connection destination change unit 504, and an assignment management unit 505.

The reception unit 501 receives requests from the customer manager computer 120 and computers in the customer environments 130. When the DNS record indicating the reception unit 501 is registered in the DNS 301, the reception unit 501 receives requests from the customer manager computer 120 and computers in the customer environments 130.

The determination unit 502 determines whether a request received by the reception unit 501 is to be processed in the Blue environment 310 or the Green environment 350. The determination unit 502 determines the transmission destination of the request to allow it to be distributed to the Blue environment 310 or the Green environment 350.

The transmission unit 503 transmits the request received by the reception unit 501 to the processing system determined by the determination unit 502.

The connection destination change unit 504 instructs the resource manager 303 to update the record in the DNS 301. The connection destination change unit 504 is a connection destination specification unit configured to make an instruction to specify the connection destination of a request.

The assignment management unit 505 manages the processing system (the Blue environment 310 or the Green environment 350) to which each tenant is assigned. When a specification is made for managing a tenant with which a request should be processed in the Green environment 350, the assignment management unit 505 performs the tenant assignment processing. The tenant assignment processing will be described below with reference to FIGS. 6 and 7.

FIG. 6 illustrates an example of a sequence in the processing system switching processing. This sequence is started after the management system 100 illustrated in FIG. 3B has been configured.

In step S601, the system administrator computer 110 requests the system manager 300 to start the processing system switching processing. The system administrator may manage the execution of the processing system switching processing based on a schedule or make a setting so as to execute the processing system switching processing automatically.

In step S602, the system manager 300 instructs the dispatch server 304 to start the processing system switching processing. The system manager 300 further provides information of records indicating connection destinations of requests to the connection destination change unit 504 of the dispatch server 304. Example records indicating connection destinations of requests include a record indicating a configuration (e.g., LBs 321 and 331) in the Blue environment 310, and a record indicating a configuration (e.g., LBs 361 and 371) in the Green environment 350. Information about these records may be included in the above-described start instruction. The information will be used in processing in steps S603, S604, S607, and S608 (described below).

In step S603, the connection destination change unit 504 of the dispatch server 304 instructs the resource manager 303 to update the record in the DNS 301. Upon reception of a request for changing a record in the DNS 301 from the system administrator computer 110, the system manager 300 may instruct the resource manager 303 to change the record in the DNS 301.

In step S604, the resource manager 303 updates the DNS record in the DNS 301 from a record indicating a configuration (e.g., LBs 321 and 331) in the Blue environment 310 to the record indicating the reception unit 501 of the dispatch server 304. More specifically, the connection destination of requests from the customer manager computer 120 and computers in the customer environments 130 is changed from the LB 321 in the WebUI layer 320 in the Blue environment 310 to the reception unit 501 of the dispatch server 304. The connection destination of requests from network devices in the customer environments 130 is changed from the LB 331 in the front-end layer 330 in the Blue environment 310 to the reception unit 501 of the dispatch server 304.

In step S605, the dispatch server 304 waits until the reception unit 501 receives a request. When the reception unit 501 receives a request for the first time after the record is updated in step S604, the processing proceeds to step S606. The system administrator may manually specify the timing for shifting to the processing illustrated in step S606 or set the relevant timing to the dispatch server 304 based on a schedule.

In step S606, the assignment management unit 505 of the dispatch server 304 performs the tenant assignment processing (see FIG. 7). Further, each time the reception unit 501 receives a request, the determination unit 502 of the dispatch server 304 performs the determination processing (see FIG. 10) for determining a processing system that should process the relevant request.

In step S607, upon detection of completion of the tenant assignment processing by the assignment management unit 505, the connection destination change unit 504 of the dispatch server 304 instructs the resource manager 303 to update the relevant record in the DNS 301.

The timing at which the connection destination change unit 504 of the dispatch server 304 receives record information indicating a configuration (e.g., LBs 361 and 371) in the Green environment 350 is not limited to step S602, and may be between steps S602 and S607. The connection destination change unit 504 of the dispatch server 304 performs processing in step S607 or S608 by using the record information indicating a configuration (e.g., LBs 361 and 371) in the Green environment 350 supplied from the system manager 300.

In step S608, the resource manager 303 updates the relevant DNS record in the DNS 301 from the record indicating the reception unit 501 of the dispatch server 304 to a record indicating a configuration (e.g., LBs 361 and 371) in the Green environment 350. More specifically, the connection destination of requests from the customer manager computer 120 and computers in the customer environments 130 is changed from the reception unit 501 of the dispatch server 304 to the LB 361 in the WebUI layer 360 in the Green environment 350. The connection destination of requests from network devices in the customer environments 130 is changed from the reception unit 501 of the dispatch server 304 to the LB 371 in the front-end layer 370 in the Green environment 350. This completes the processing system switching processing.

Upon detection of update of the DNS record by the resource manager 303, the connection destination change unit 504 may perform processing for deleting or deactivating the dispatch server 304 itself.

FIG. 7 is a flowchart illustrating an example of the tenant assignment processing performed by the assignment management unit 505.

In a processing loop from step S701 to step S703, the assignment management unit 505 repetitively performs processing in step S702 until a condition illustrated in step S701 is satisfied. The condition in step S701 is that all of management target tenants of the management system 100 are assigned to the Green environment 350. In step S702, the assignment management unit 505 specifies a part of tenants assigned to the Blue environment 310 out of all of tenants of the customer manager and customers using the management system 100, and performs the processing for assigning the specified tenants to the Green environment 350. Information (specification information) relating to the tenant assignment is used in the determination processing described below (see FIG. 10). When the system manager 300 instructs the dispatch server 304 to start the processing system switching processing and then the dispatch server 304 starts this processing, all of tenants of the customer manager and customers using the management system 100 are assigned to the Blue environment 310, and requests from these requestors are to be processed in the Blue environment 310. The assignment management unit 505 manages information about tenants assigned to the Green environment 350 in the processing in step S702 and information about all of tenants using the management system 100 by using respective tables. These tables are described below with reference to FIGS. 8A and 8B.

In step S703, when not all of tenants have been assigned to the Green environment 350, the processing return to step S701. Suppose that the contents of the table for managing the information about tenants assigned to the Green environment 350 coincide with the contents of the table for managing the information about all of tenants using the management system 100. In this case, the assignment management unit 505 determines that all of tenants have been assigned to the Green environment 350. Then, the assignment management unit 505 notifies the connection destination change unit 504 of completion of the tenant assignment processing. Then, the connection destination change unit 504 instructs the resource manager 303 to update the relevant record in the DNS 301.

When a predetermined time has elapsed after completing the tenant assignment processing in step S702, the processing proceeds to step S703. More specifically, the tenant assignment processing in step S702 will be repeated at intervals of a predetermined time period.

The processing is processing for distributing requests to the Blue environment 310 and the Green environment 350 so that processing for the requests is not stagnated in the Green environment 350, even when a large number of requests are distributed to the management system 100. More specifically, it is preferable that requests are distributed to the Green environment 350 over time during which the resource manager 303 completes resource adjustment processing such as auto-scale processing on the Green environment 350. In this case, the resource manager 303 completes the resource adjustment processing on the Green environment 350 within several minutes after completing processing for a request having a certain amount of processing load. After completing the resource adjustment processing, a large number of requests can be processed also in the Green environment 350. Therefore, the number of tenants to be assigned in step S702 or the above-described predetermined time interval is to be determined so that the entire processing is completed within several ten seconds to several hours after the dispatch server 304 first receives a request.

Upon completion of the tenant assignment processing, the upgrade of the management system 100 is completed. In the present exemplary embodiment, although a large number of requests are received from external networks, it is possible to upgrade the system in a comparatively short time without processing stagnation in the Green environment 350, even when a first processing system is subjected to a large processing load.

When the number of requests distributed to the management system 100 decreases, the above-described predetermined time interval may be automatically changed by the dispatch server 304 or manually changed by the system administrator to complete the tenant assignment processing in a shorter time period.

In the descriptions with reference to FIG. 6, the assignment management unit 505 starts the tenant assignment processing at a timing after the reception unit 501 of the dispatch server 304 receives a request for the first time in step S606. However, the timing for starting the tenant assignment processing is not limited thereto, and the processing may be started at a timing before the reception unit 501 receives a request for the first time. However, it is necessary that the tenant assignment processing is not completed before the reception unit 501 of the dispatch server 304 receives a request for the first time. If the tenant assignment processing is completed before the timing, the dispatch server 304 will transmit all of requests received via the reception unit 501 to the Green environment 350. In this case, there is a concern that the resource adjustment processing such as auto-scale processing on the Green environment 350 by the resource manager 303 is late. Therefore, in the present exemplary embodiment, in a case where the tenant assignment processing is started at a timing before the reception unit 501 receives a request for the first time, the assignment management unit 505 performs the tenant assignment processing in step S702 for the N-th (N≥2) time after the reception unit 501 receives a request for the first time.

FIGS. 8A and 8B illustrate examples of tenant management tables managed by the dispatch server 304. The tenant management table illustrated in FIG. 8A manages tenants assigned to the Green environment 350. The tenant management table illustrated in FIG. 8B manages all of tenants of the customer manager and customers using the management system 100.

FIG. 8A illustrates an example of an assignment management table. The assignment management unit 505 manages information about tenants assigned to the Green environment 350 according to the tenant assignment processing in step S702 based on the assignment management table. Each time the assignment management unit 505 performs the tenant assignment processing, the number of records indicating tenants gradually increases.

In this table, a tenant identifier (ID) 800 of tenants assigned to the Green environment 350 is described. For example, the assignment management unit 505 manages the tenant IDs of tenants (such as records 801 to 805) assigned to the Green environment 350. The tenant ID is information, handled in the management system 100, which may be used to uniquely identify a tenant to which each of customers and the customer manager belongs. To acquire the tenant ID of a tenant to be assigned to the Green environment 350, the assignment management unit 505 refers to a tenant list table illustrated in FIG. 8B (described below).

FIG. 8B illustrates an example of the tenant list table. Based on this tenant list table, the assignment management unit 505 manages information about all of tenants of the customer manager and customers using the management system 100.

In the tenant list table, the tenant IDs of all of tenants of the customer manager and customers using the management system 100. The assignment management unit 505 acquires information about all of tenants of the customer manager and customers using the management system 100 from the database 302. Alternatively, the assignment management unit 505 may be controlled to hold data regarding tenants stored in the database 302 when generating the dispatch server 304. For example, the assignment management unit 505 manages the tenant IDs of all of tenants (such as records 811 to 817) of the customer manager and customers using the management system 100.

Figure 9:
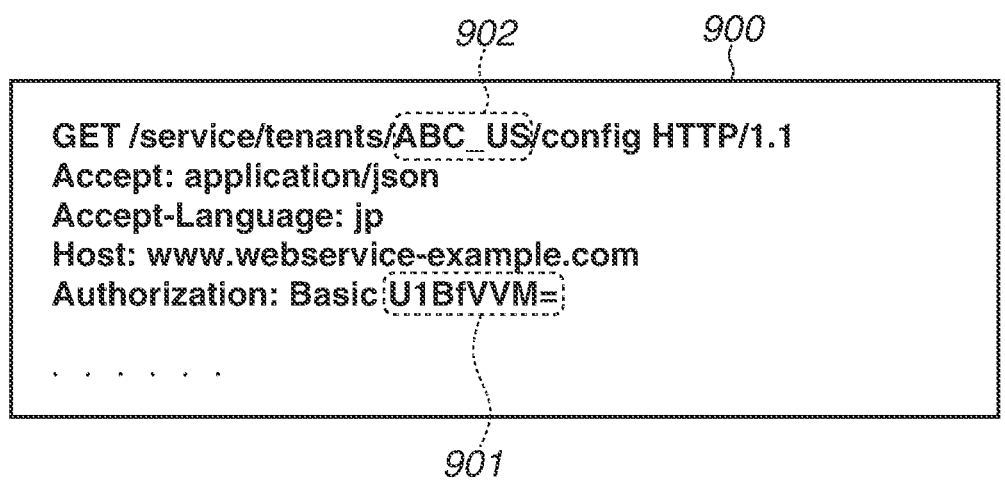
FIG. 9 is a diagram illustrating an example of a hypertext transfer protocol (HTTP) request received by a reception unit.

FIG. 9 illustrates an example of a Hypertext Transfer Protocol (HTTP) request received from a predetermined network system by the reception unit 501. This HTTP request includes the tenant ID indicating the requestor of the request, and the tenant ID indicating the request processing target. An HTTP request 900 indicates an example of a request used by a user corresponding to a certain tenant ID "SP_US" to request data "config" managed as a tenant identified by another tenant ID "ABC_US."

A request from the customer manager computer 120 and computers in the customer environments 130 includes information for identifying the tenant of the customer manager or a customer who specified the transmission of the relevant request (hereinafter, referred to as a transmitting tenant). A request from the customer manager computer 120 may include information for identifying the tenant of a customer relating to processing of the relevant request.

For example, suppose that the customer manager sends a request for updating and referring to data managed as the tenant of a customer. In that case, the request includes information indicating a tenant different from information indicating a transmitting tenant (the tenant ID of the customer manager). For example, the information indicating the different tenant is included as a part of information indicating the storage location of the result of request processing. Thus, when the tenant indicating the requestor of a request differs from the tenant indicating the request processing target, the tenant indicating the request processing target is referred to as a related tenant.

The HTTP request 900 includes information 901 indicating the tenant ID corresponding to the customer manager or a customer who specified request processing, as the value of an authentication header. In the case of this example, it is possible to obtain the tenant ID "SP_US" by decoding the information 901 included in the authentication header based on the Base64 encoding method.

The HTTP request 900 includes as a part of a request Uniform Resource Identifier (URI) a tenant ID 902 corresponding to a customer relating to request processing. In the case of this example, it can be determined as a request relating to "config" data managed as the tenant "ABC_US" identified by the tenant ID 902.

Suppose that the reception unit 501 receives the HTTP request 900 illustrated in FIG. 9. In this case, the reception unit 501 and the determination unit 502 are able to acquire information for identifying a transmitting tenant "SP_US" and a related tenant "ABC_US" included in the relevant request, respectively.

The identification of a transmitting tenant and a related tenant can be achieved, not only with the above-described method, but also with other HTTP header or a HTTP request body. Further, the identification is not limited to the HTTP request, and may be achieved by a request of other protocol.

Based on information for identifying a transmitting tenant and a related tenant included in a request and information in the assignment management table illustrated in FIG. 8A, the determination unit 502 determines a processing system to be used to process the request.

Figure 10:
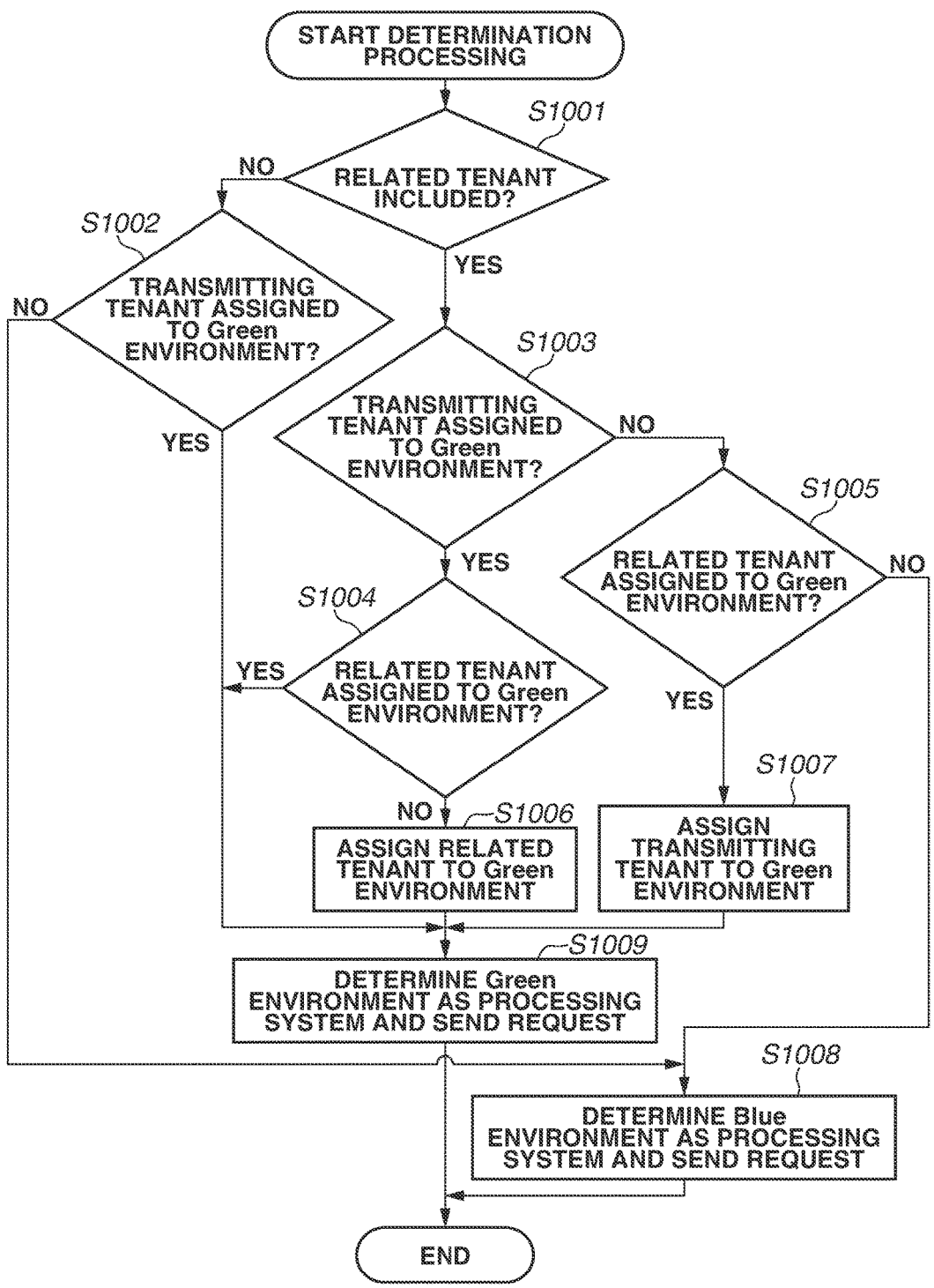
FIG. 10 is a flowchart illustrating an example of request transmission destination determination processing.

FIG. 10 is a flowchart illustrating an example of processing performed by the determination unit 502 to determine a processing system as the transmission destination of a request received by the reception unit 501. When the reception unit 501 receives a request, the processing is started. The processing enables suitably determining a processing system to be used to process the request. The processing will be performed asynchronously with the tenant assignment processing illustrated in FIG. 7.

In step S1001, the determination unit 502 determines whether related tenant information is included in the request received by the reception unit 501. When related tenant information is not included in the request received by the reception unit 501 (NO in step S1001), the processing proceeds to step S1002. On the other hand, when the information is included in the request (YES in step S1001), the processing proceeds to step S1003.

In step S1002, the determination unit 502 refers to the assignment management table illustrated in FIG. 8A to determine whether the transmitting tenant included in the request received by the reception unit 501 is described in the relevant table. When the transmitting tenant is not described in the assignment management table (NO in step S1002), the processing proceeds to step S1008. On the other hand, when the transmitting tenant is described in the table (YES in step S1002), the processing proceeds to step S1009.

In step S1003, the determination unit 502 refers to the assignment management table illustrated in FIG. 8A to determine whether the transmitting tenant included in the request received by the reception unit 501 is described in the table. When the transmitting tenant is described in the assignment management table (YES in step S1003), the processing proceeds to step S1004. On the other hand, when the transmitting tenant is not described in the relevant table (NO in step S1003), the processing proceeds to step S1005.

In step S1004, the determination unit 502 refers to the assignment management table illustrated in FIG. 8A to determine whether the related tenant included in the request received by the reception unit 501 is described in the table. When the related tenant is not described in the assignment management table (NO in step S1004), the processing proceeds to step S1006. On the other hand, when the related tenant is described in the relevant table (YES in step S1004), the processing proceeds to step S1009. In step S1006, the assignment management unit 505 performs the tenant assignment processing for assigning the tenant ID acquired as a related tenant to the Green environment 350. More specifically, the assignment management unit 505 additionally registers the tenant ID acquired as a related tenant in the assignment management table. Upon completion of the processing in step S1006, the processing proceeds to step S1009.

In step S1005, the determination unit 502 refers to the assignment management table illustrated in FIG. 8A to determine whether the related tenant included in the request received by the reception unit 501 is described in the table. When the related tenant is described in the table (YES in step S1005), the processing proceeds to step S1007. On the other hand, when the related tenant is not described in the table (NO in step S1005), the processing proceeds to step S1008. In step S1007, the assignment management unit 505 performs the tenant assignment processing for assigning a transmitting tenant to the Green environment 350. More specifically, the assignment management unit 505 additionally registers the tenant ID acquired as a transmitting tenant in the assignment management table. Upon completion of the processing in step S1007, the processing proceeds to step S1009.

In step S1008, the determination unit 502 determines the Blue environment 310 as a processing system to be used to process the request received at this time. On the other hand, in step S1009, the determination unit 502 determines the Green environment 350 as a processing system to be used to process the request received at this time. After completing this determination, the transmission unit 503 of the dispatch server 304 transmits a request to a configuration (e.g., LB) existing in the processing system determined by the determination unit 502.

In general, when a customer belonging to a certain tenant does not have the authority to access data of the tenant of other customer or the tenant of the customer manager, related tenant information is not included in a request according to an instruction from the customer. On the other hand, since the customer manager can access data of the tenant of a management target customer, related tenant information is included only in a request according to an instruction from the customer manager.

In this case, information of the tenant of the customer manager who manages the customer is not included in a request according to an instruction from the customer, a processing system to be used to process the request will be determined only by the transmitting tenant assignment in step S1002. Therefore, to allow a request according to an instruction from the customer to be processed by the same processing system as the one that processes a request according to an instruction from the customer manager, the above-described processing in steps S1006 and S1007 is required. More specifically, when a request according to an instruction from the customer manager is received, the assignment management unit 505 is controlled to perform the assignment processing on the tenant of the management target customer of the customer manager, which is a related tenant included in the request. However, when information of the customer manager, who manages the customer manager himself or herself, is to be included as a related tenant also in a request according to an instruction from the customer, the processing in steps S1006 and S1007 may be omitted.

As described above, in the present exemplary embodiment, the assignment management unit 505 adds the tenant ID one by one to the assignment management table illustrated in FIG. 8A so that processing for distributing requests to a plurality of processing systems is performed. Performing the request distribution processing enables preventing the stagnation of request processing in the Green environment 350.

Meanwhile, based on information for identifying a transmitting tenant and a related tenant included in a received request and information of the assignment management table illustrated in FIG. 8A, the determination unit 502 determines a processing system to be used to process the request. This processing by the determination unit 502 enables the management system 100, for example, to process a plurality of requests according to instructions from the customer manager and customers who may refer to the same data, by using the same processing system. This enables preventing failures in request processing which may occur when the requests are processed by respective different processing systems.

In the first exemplary embodiment, in the tenant assignment processing, the assignment management unit 505 manages information of tenants assigned to the Green environment 350, by using the assignment management table. In the present exemplary embodiment, on the other hand, the assignment management unit 505 manages information about tenants assigned to the Blue environment 310, by using the assignment management table. The present exemplary embodiment will be described below centering on differences from the first exemplary embodiment.

Figure 11:
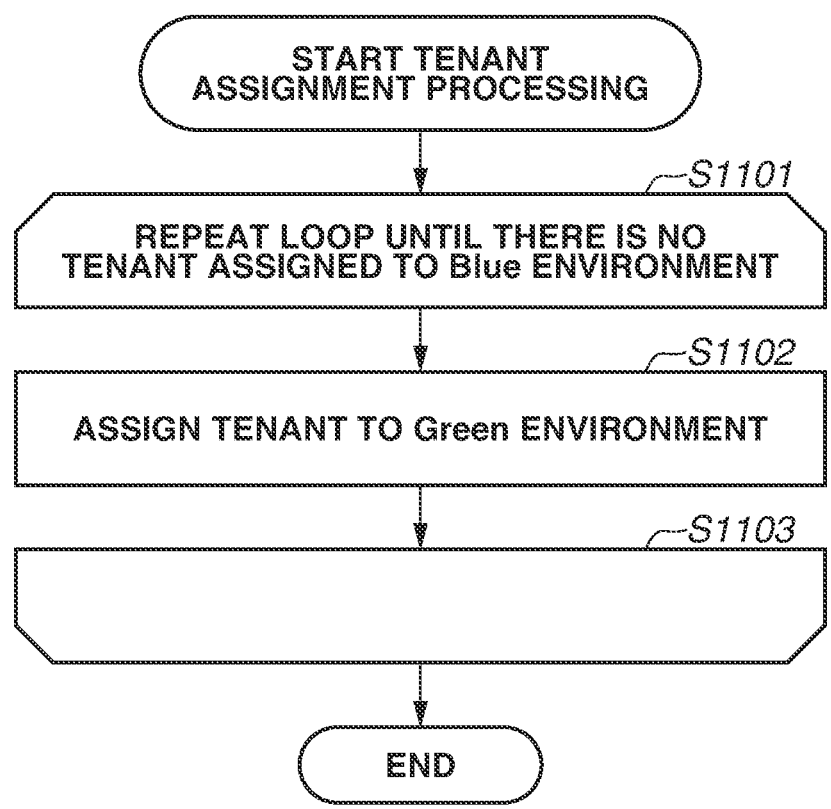
FIG. 11 is a flowchart illustrating an example of tenant assignment processing.

FIG. 11 is a flowchart illustrating an example of the tenant assignment processing performed by the assignment management unit 505.

In a processing loop including steps S1101 to S1103, the assignment management unit 505 repeats the tenant assignment processing in step S1102 until the condition illustrated in step S1101 is satisfied. The condition illustrated in step S1101 is that there is no more tenant assigned to the Blue environment 310 out of all of management target tenants of the management system 100.

In step S1102, the assignment management unit 505 specifies a part of tenants assigned to the Blue environment 310 out of all of tenants of the customer manager and customers using the management system 100, and performs processing for assigning the specified tenants to the Green environment 350. When this processing is started after an instruction for starting the processing system switching processing, requests having all of tenants of the customer manager and customers using the management system 100 as requestors are to be processed in the Blue environment 310. The assignment management unit 505 manages the information about tenants assigned to the Blue environment 310 in the processing in step S1102 and the information about all of tenants using the management system 100 based on respective tables. This table will be described below with reference to FIG. 12.

In step S1103, when there is a tenant assigned to the Blue environment 310, the processing returns to step S1101.

When the table for managing the information about tenants assigned to the Blue environment 310 becomes empty, the assignment management unit 505 determines that there is no more tenant assigned to the Blue environment 310. Then, the assignment management unit 505 notifies the connection destination change unit 504 of completion of the processing system switching processing. The connection destination change unit 504 instructs the resource manager 303 to update the relevant record in the DNS 301.

When a predetermined time has elapsed after completing the tenant assignment processing in step S1102, the processing proceeds to step S703. More specifically, the tenant assignment processing in step S702 is to be repeated at intervals of a predetermined time period. When the number of requests distributed to the management system 100 decreases, the time interval may be automatically changed by the dispatch server 304 or manually changed by the system administrator to complete the tenant assignment processing in a shorter time period. One or more tenants may be assigned to the Green environment 350 in single assignment processing.

Figure 12:
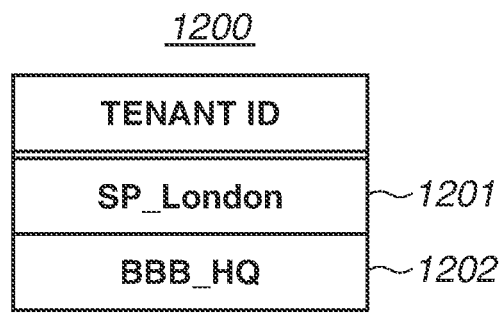
FIG. 12 is a diagram illustrating an example of a tenant management table managed by the dispatch server.

FIG. 12 illustrates an example of an assignment management table managed by the dispatch server 304.

The assignment management unit 505 manages the information about tenants assigned to the Blue environment 310 according to the processing in step S1102 by using the assignment management table. Each time the assignment processing is performed by the assignment management unit 505, the number of records indicating tenants managed in the relevant table will decrease one by one.

A tenant ID 1200 of a tenant assigned to the Blue environment 310 is described in the table. The assignment management unit 505 manages the tenant ID of tenants (such as records 1201 and 1202) assigned to the Blue environment 310.

The assignment management table according to the present exemplary embodiment includes information about all of tenants of the customer manager and customers using the management system 100 when starting the processing system switching processing. Before performing the processing system switching processing, the assignment management unit 505 acquires information about all of tenants of the customer manager and customers using the management system 100. However, in the present exemplary embodiment, the assignment management unit 505 does not need to hold the tenant list table illustrated in FIG. 7B during execution of the processing system switching processing.

The determination processing according to the present exemplary embodiment will be described below with reference to FIG. 10. The processing according to the present exemplary embodiment illustrated in FIG. 10 differs from the processing according the first exemplary embodiment in the use of the assignment management table illustrated in FIG. 12. Descriptions will be made in detail below taking this point into consideration.

In step S1001, the determination unit 502 determines whether related tenant information is included in a request received by the reception unit 501. When the related tenant information is not included in the request received by the reception unit 501 (NO in step S1001), the processing proceeds to step S1002. On the other hand, when the related tenant information is included the relevant request (YES in step S1001), the processing proceeds to step S1003.

In step S1002, the determination unit 502 refers to the assignment management table illustrated in FIG. 12 to determine whether a transmitting tenant included in the request received by the reception unit 501 is described in the table. When a transmitting tenant is described in the assignment management table and is not assigned to the Green environment 350 (NO in step S1002), the processing proceeds to step S1008. On the other hand, when a transmitting tenant is not described in the assignment management table and is assigned to the Green environment 350 (YES in step S1002), the processing proceeds to step S1009.

In step S1003, the determination unit 502 refers to the assignment management table illustrated in FIG. 12 to determine whether a transmitting tenant included in the request received by the reception unit 501 is described in the table. When a transmitting tenant is not described in the assignment management table and is assigned to the Green environment 350 (YES in step S1003), the processing proceeds to step S1004. On the other hand, when a transmitting tenant is described in the assignment management table and is not assigned to the Green environment 350 (NO in step S1003), the processing proceeds to step S1005.

In step S1004, the determination unit 502 refers to the assignment management table illustrated in FIG. 12 to determine whether a related tenant included in the request received by the reception unit 501 is described in the table. When a related tenant is described in the assignment management table and is not assigned to the Green environment 350 (NO in step S1004), the processing proceeds to step S1006. On the other hand, when a related tenant is not described in the assignment management table and is assigned to the Green environment 350 (YES in step S1004), the processing proceeds to step S1009. In step S1006, the assignment management unit 505 performs the assignment processing for assigning the tenant ID acquired as a related tenant to the Green environment 350. More specifically, the assignment management unit 505 deletes the tenant ID acquired as a related tenant from the assignment management table. Upon completion of the processing in step S1006, the processing proceeds to step S1009.

In step S1005, the determination unit 502 refers to the assignment management table illustrated in FIG. 12 to determine whether a related tenant included in the request received by the reception unit 501 is described in the table. When a related tenant is not described in the assignment management table and is assigned to the Green environment 350 (YES in step S1005), the processing proceeds to step S1007. On the other hand, when a related tenant is described in the assignment management table and is not assigned to the Green environment 350 (NO in step S1005), the processing proceeds to step S1008. In step S1007, the assignment management unit 505 performs the assignment processing for assigning the transmitting tenant to the Green environment 350. More specifically, the assignment management unit 505 deletes the tenant ID acquired as a transmitting tenant from the assignment management table. Upon completion of the processing in step S1007, the processing proceeds to step S1009.

In step S1008, the determination unit 502 determines the Blue environment 310 as a processing system to be used to process the request received at this time. Meanwhile, in step S1009, the determination unit 502 determines the Green environment 350 as a processing system to be used to process the request received at this time. After completing this determination, the transmission unit 503 of the dispatch server 304 transmits a request to a configuration (LB, etc.) existing in the processing system determined by the determination unit 502.

The present exemplary embodiment employs an assignment management method different from the one according to the first exemplary embodiment. Different from the first exemplary embodiment, in the present exemplary embodiment, the assignment management unit 505 does not need to hold the tenant list table illustrated in FIG. 7B during execution of the processing system switching processing.

(First Application Example)

In the first and the second exemplary embodiments, the resource manager 303 generates the dispatch server 304 simultaneously with the generation of the Green environment 350 or according to the timing of the generation of the Green environment 350. In the present application example, the resource manager 303 generates the dispatch server 304 after receiving a request for starting the processing system switching processing from the system administrator, and deletes the dispatch server 304 after completing the processing system switching processing.

Figure 13:
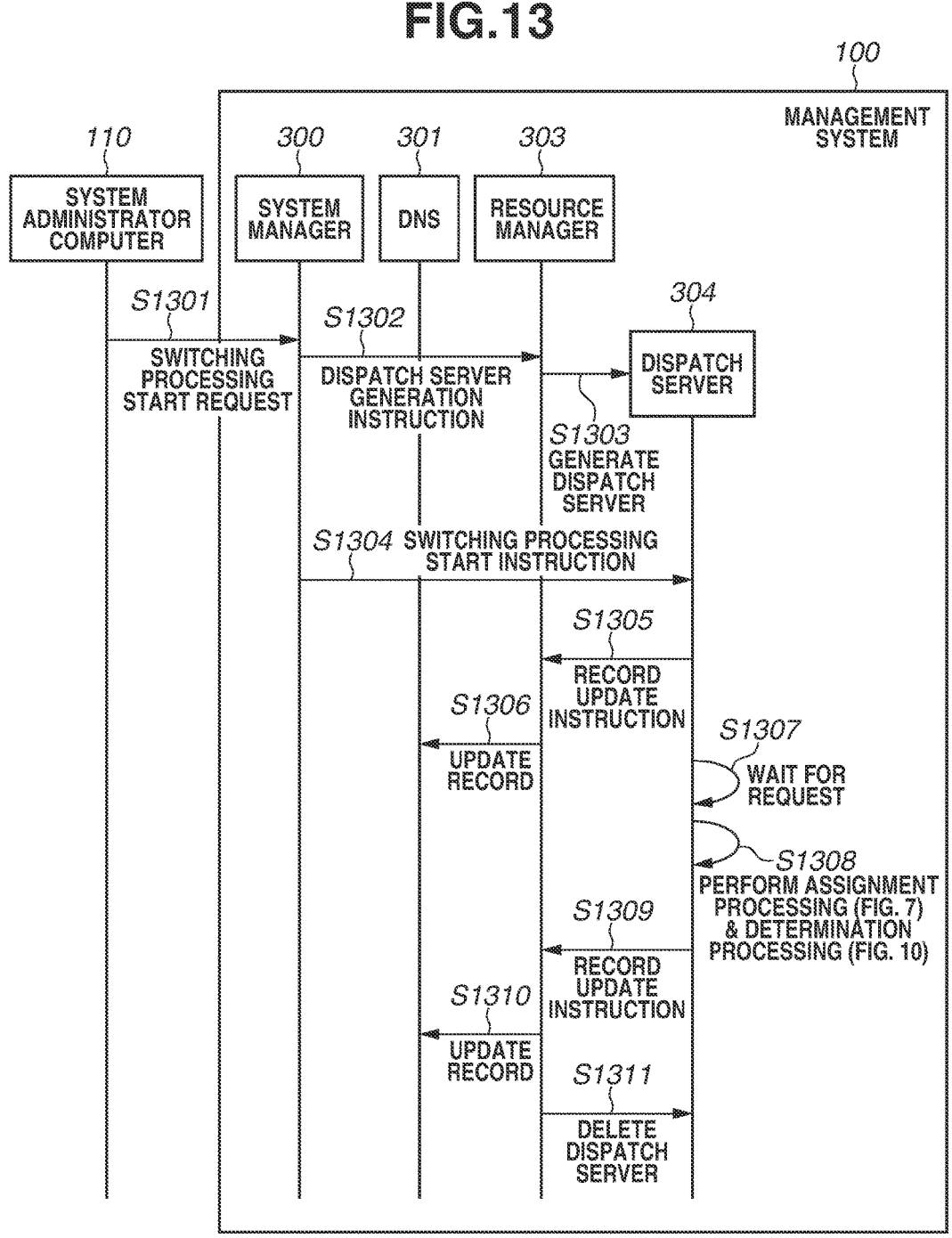
FIG. 13 is a sequence diagram illustrating an example of processing system switching processing.

FIG. 13 is a sequence diagram illustrating an example of the processing system switching processing.

In step S1301, the system administrator computer 110 requests the system manager 300 to start the processing system switching processing. The system administrator may manage the execution of the processing system switching processing based on a scheduled or make a setting so as to execute the processing system switching processing automatically.

In step S1302, the system manager 300 instructs the resource manager 303 to generate the dispatch server 304.

In step S1303, the resource manager 303 generates the dispatch server 304.

In step S1304, the resource manager 303 instructs the dispatch server 304 to start the processing system switching processing. The system manager 300 further supplies record information indicating the connection destination of requests to the connection destination change unit 504 of the dispatch server 304. Example records indicating connection destinations of requests include a record indicating a configuration (e.g., LBs 321 and 331) in the Blue environment 310, and a record indicating a configuration (e.g., LBs 361 and 371) in the Green environment 350. Information of these records may be included in the instruction for starting the processing system switching processing. The information will be used for processing in subsequent steps S1305, S1306, S1309, and S1310.

In step S1305, the connection destination change unit 504 of the dispatch server 304 instructs the resource manager 303 to update the record in the DNS 301.

Upon reception of a request for changing a record in the DNS 301 from the system administrator computer 110, the system manager 300 may instruct the resource manager 303 to change the record in the DNS 301.

In step S1306, the resource manager 303 updates the DNS record in the DNS 301 from a record indicating a configuration (e.g., LBs 321 and 331) in the Blue environment 310 to the record indicating the reception unit 501 of the dispatch server 304. More specifically, the connection destination of requests from the customer manager computer 120 and computers in the customer environments 130 is changed from the LB 321 in the WebUI layer 320 in the Blue environment 310 to the reception unit 501 of the dispatch server 304. Further, the connection destination of requests from network devices in the customer environments 130 is changed from the LB 331 in the front-end layer 330 in the Blue environment 310 to the reception unit 501 of the dispatch server 304.

In step S1307, the dispatch server 304 waits until the reception unit 501 receives a request. After the record is updated in step S1305, the dispatch server 304 waits until the reception unit 501 receives a request in step S1306. When the reception unit 501 receives a request for the first time, the processing proceeds to step S1307. Then, the processing proceed to step S1308, and the system administrator may manage the timing for starting the tenant assignment processing based on a schedule or make a setting so as to execute the tenant assignment processing automatically.

In step S1308, the assignment management unit 505 of the dispatch server 304 performs the tenant assignment processing (see FIG. 7 or 11). Each time the reception unit 501 receives a request, the determination unit 502 of the dispatch server 304 performs the determination processing (see FIG. 10) for determining a processing system to be used to process the request.

In step S1309, upon completion of the tenant assignment processing by the assignment management unit 505, the connection destination change unit 504 of the dispatch server 304 instructs the resource manager 303 to update the record in the DNS 301.

The timing at which the connection destination change unit 504 of the dispatch server 304 receives record information indicating a configuration (e.g., LBs 361 and 371) in the Green environment 350 is not limited to step S1302, and may be a timing after step S1302 and before step S1307. The connection destination change unit 504 of the dispatch server 304 performs processing in steps S1309 or S1310 by using the record information indicating a configuration (e.g., LBs 361 and 371) in the Green environment 350 supplied from the system manager 300.

In step S1310, the resource manager 303 updates the DNS record in the DNS 301 from the record indicating the dispatch server 304 to the record indicating the Green environment 350. More specifically, the connection destination of requests from the customer manager computer 120 and computers in the customer environments 130 is changed from the reception unit 501 of the dispatch server 304 to the LB 361 in the WebUI layer 360 in the Green environment 350. Further, the connection destination of requests from network devices in the customer environments 130 is changed from the reception unit 501 of the dispatch server 304 to the LB 371 in the front-end layer 370 in the Green environment 350. This completes the processing system switching processing.

In step S1311, the resource manager 303 deletes the dispatch server 304. In the dispatch server 304, the dispatch server 304 may be preset to be automatically deleted after completion of the processing system switching processing. Further, the system administrator computer 110 may request the system manager 300 to delete the dispatch server 304, and then the system manager 300 may request the resource manager 303 to delete the dispatch server 304.

The timing at which the assignment management unit 505 starts the tenant assignment processing may be in step S1307 as described above or between steps S1303 and S1306.

In the above descriptions, the connection destination change unit 504 of the dispatch server 304 instructs the resource manager 303 to update the record in the DNS 301 after completion of the tenant assignment processing in step S1309.

When the resources of the Green environment 350 have been adjusted by the resource manager 303, a large number of requests can be processed in the Green environment 350. Therefore, as long as the resources of the Green environment 350 have been adjusted by the resource manager 303, the dispatch server 304 may instruct the resource manager 303 to update the relevant record, even if the assignment management unit 505 has not completed the tenant assignment processing. In this case, the system manager 300 may instruct the resource manager 303 to update the record and delete the dispatch server 304.

The sequence illustrated in FIG. 13 differs from the sequence illustrated in FIG. 6 in that steps S1303 and S1311 are added thereto. In the present application example, providing a dispatch server only when performing the processing system switching processing enables reducing the resources and cost for the maintenance of the dispatch server 304 in comparison with the first and the second exemplary embodiments.

(Second Application Example)

In the first and the second exemplary embodiments and in the first application example, in steps S604 and S1305, the resource manager 303 updates the DNS record in the DNS 301 to the record indicating the reception unit 501 of the dispatch server 304. After the record has been updated in this way, the reception unit 501 of the dispatch server 304 will receive all of the requests. In the present application example, to reduce effects of a failure in setting and throughput of the dispatch server 304, the number of requests to be received by the reception unit 501 of the dispatch server 304 is set to increase step by step. The resource manager 303 enables the distribution function of the DNS 301, and increases step by step the number of requests to be received by the reception unit 501 of the dispatch server 304.

Figure 14:
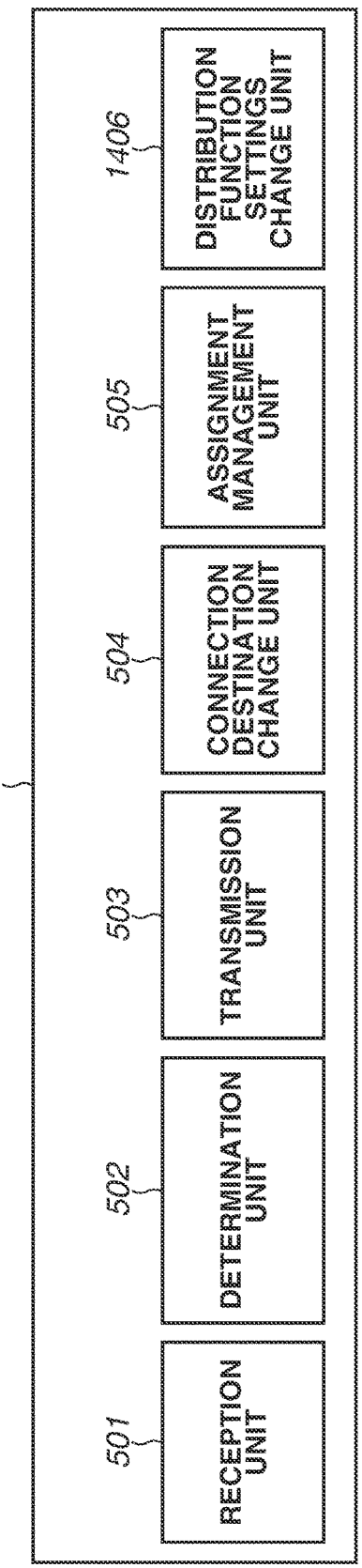
FIG. 14 is a block diagram illustrating an example of a software module configuration of a dispatch server.

FIG. 14 is a block diagram illustrating an example of a software module configuration of the dispatch server 304. The dispatch server 304 includes the reception unit 501, the determination unit 502, the transmission unit 503, the connection destination change unit 504, the assignment management unit 505, and a distribution function settings change unit 1406. This application example differs from the first and the second exemplary embodiments and the first application example in that the distribution function settings change unit 1406 is newly added to the dispatch server 304.

The reception unit 501, the determination unit 502, the transmission unit 503, the connection destination change unit 504, and the assignment management unit 505 are the same as those described above.

The distribution function settings change unit 1406 instructs the resource manager 303 to change the setting of the request distribution function of the DNS 301. The request distribution function refers to a function of distributing requests to a plurality of connection destinations by using a plurality of records registered in the DNS 301.

Figure 15:
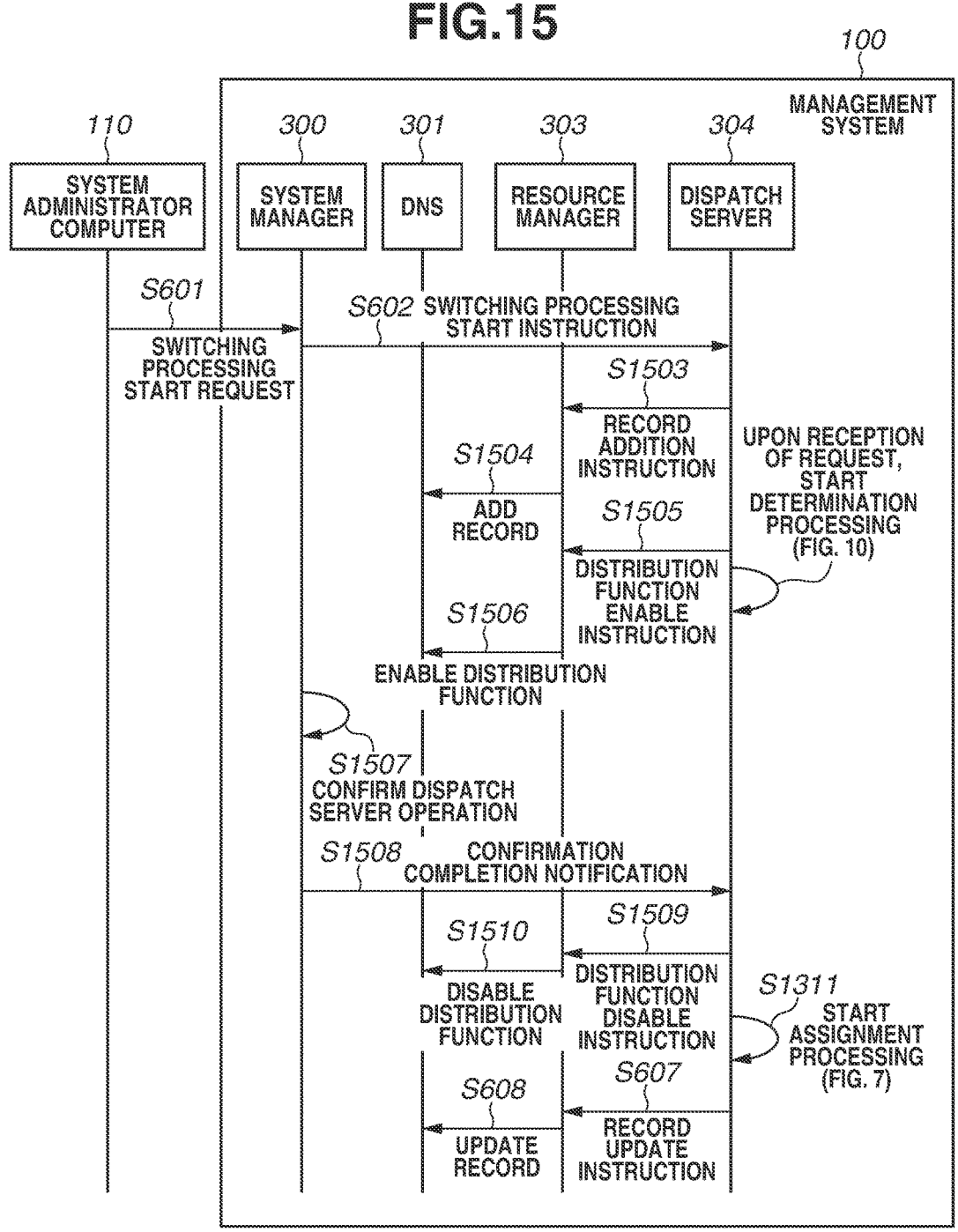
FIG. 15 is a sequence diagram illustrating an example of processing system switching processing.

FIG. 15 is a sequence diagram illustrating an example of the processing system switching processing. Other than steps S1503 and S1510, this sequence is similar to the one illustrated in FIG. 6, and redundant descriptions thereof will be omitted.

In step S1503, the connection destination change unit 504 of the dispatch server 304 instructs the resource manager 303 to add the record indicating the reception unit 501 of the dispatch server 304 to a record in the DNS 301.

Upon reception of a request for changing a record in the DNS 301 from the system administrator computer 110, the system manager 300 may instruct the resource manager 303 to add the record in the DNS 301.

In step S1504, the resource manager 303 adds the record indicating the reception unit 501 of the dispatch server 304 to the DNS 301 in addition to a record indicating a configuration (e.g., LBs 321 and 331) in the Blue environment 310.

In step S1505, the distribution function settings change unit 1406 of the dispatch server 304 instructs the resource manager 303 to enable the setting of the request distribution function of the DNS 301.

In step S1506, the resource manager 303 enables the setting of the request distribution function of the DNS 301. Then, requests from the customer manager computer 120 and computers in the customer environments 130 are distributed to the LB 321 in the WebUI layer 320 in the Blue environment 310 and the reception unit 501 of the dispatch server 304. Further, requests from network devices in the customer environments 130 are distributed to the LB 331 in the front-end layer 330 in the Blue environment 310 and the reception unit 501 of the dispatch server 304. When the reception unit 501 of the dispatch server 304 receives a request, the determination unit 502 starts the determination processing (see FIG. 10). All of the requests received by the reception unit 501 before the tenant assignment processing (see FIG. 10) is started will be processed in the Blue environment 310.

In step S1507, the system manager 300 checks whether the dispatch server 304 normally operates. In step S1508, the system manager 300 notifies the dispatch server 304 of completion of operation check for the dispatch server 304.

In step S1507, when the system manager 300 confirms that the dispatch server 304 does not normally operate, the system manager 300 instructs the resource manager 303 to change the relevant record in the DNS 301. More specifically, the system manager 300 instructs the resource manager 303 to change the record to a record indicating a configuration (e.g., LBs 321 and 331) in the Blue environment 310. According to the instruction, the resource manager 303 changes the record in the DNS 301. This processing enables temporarily stopping the entire processing system switching processing using the dispatch server 304. Accordingly, the system administrator computer 110 is able to take measures, for example, correct a defective portion in the configuration of the dispatch server 304.

In step S1509, the distribution function settings change unit 1406 of the dispatch server 304 instructs the resource manager 303 to disable the setting of the request distribution function of the DNS 301. In this case, when the setting of the distribution function is disabled, the record in the DNS 301 is changed to the record indicating the reception unit 501 of the dispatch server 304.

In step S1510, the resource manager 303 disables the setting of the request distribution function of the DNS 301. Then, the record in the DNS 301 is changed to the record indicating the reception unit 501 of the dispatch server 304.

In step S1511, the assignment management unit 505 of the dispatch server 304 performs the tenant assignment processing (see FIG. 7).

In the present application example, if a failure is found in settings or throughput of the dispatch server 304, taking measures for preventing distribution of requests to the dispatch server 304 enables reducing the number of requests subjected to the failure of the dispatch server 304.

(Third Application Example)

In the first and the second exemplary embodiments and in the first and the second application examples, when the customer manager computer 120 and computers in the customer environments 130 send a request to the management system 100, they hold information indicating the connection destination of the request registered in the DNS 301.

However, each time the customer manager computer 120 and computers in the customer environments 130 send a request, they do not necessarily make an inquiry to the DNS 301 about the connection destination of the relevant request. Web browsers on the customer manager computer 120 and computers in the customer environments 130 are able to hold information indicating the connection destination (e.g., IP address) for a certain fixed time period as a cache. With requests using web browsers on the customer manager computer 120 and computers in the customer environments 130, the held information may be used as a connection destination. In a time period during which the information indicating the connection destination of a request is held by the customer manager computer 120 or computers in the customer environment 130, the resource manager 303 may change a record in the DNS 301. In this case, after the resource manager 303 has changed the record in the DNS 301, a request may be transmitted from the customer manager computer 120 and the like to the Blue environment 310.

The present application example will be described below based on a configuration of not receiving a request transmitted based on an old IP address after the resource manager 303 has changed the record in the DNS 301. More specifically, to prevent the management system 100 from receiving the request, the resource manager 303 changes the firewall setting in each processing system. Hereinafter, a firewall may be referred to as an FW.

Figure 16:
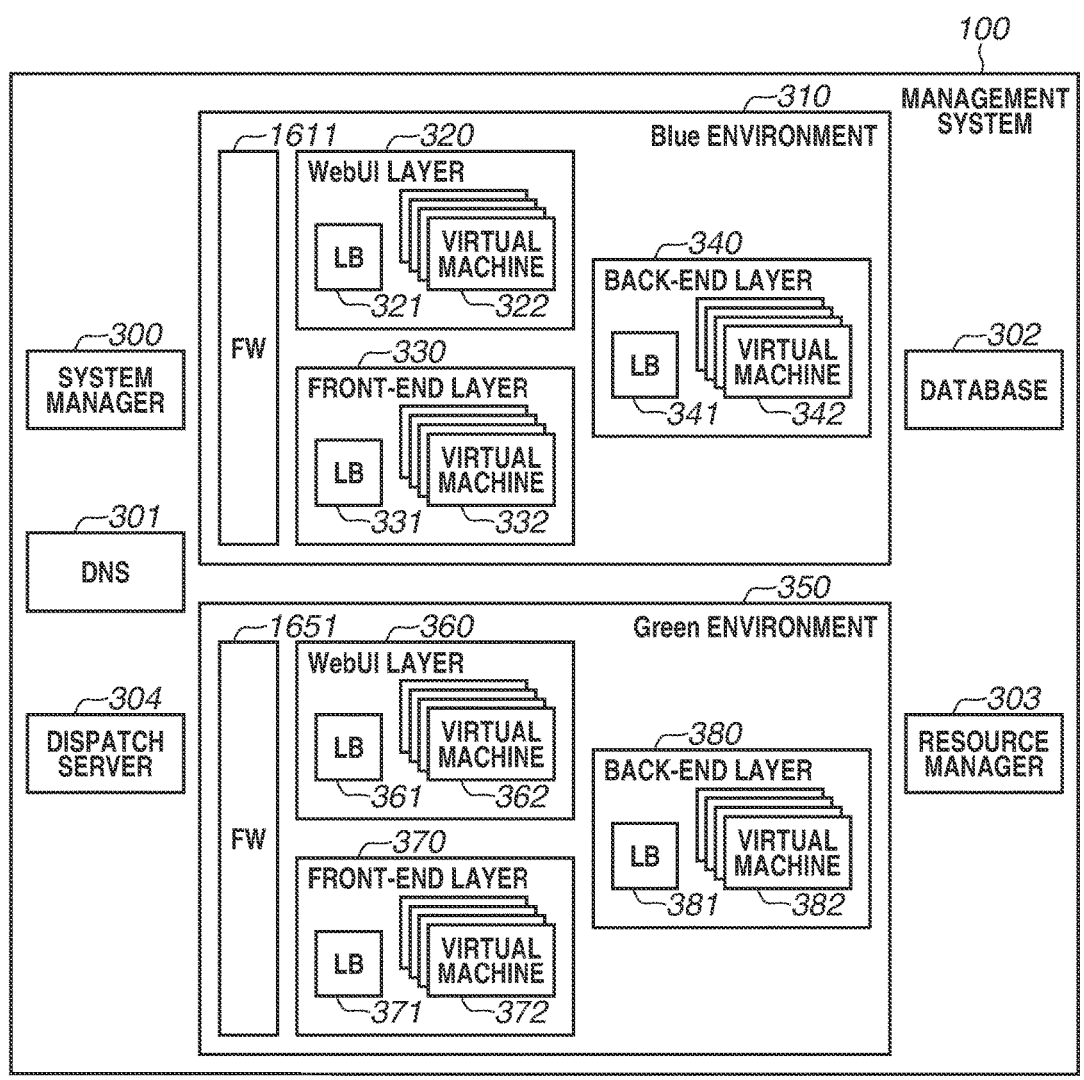
FIG. 16 is a block diagram illustrating a configuration of the management system.

FIG. 16 is a block diagram illustrating a configuration of the management system 100 including FWs. According to settings by the resource manager 303, FWs 1611 and 1651 perform control to prevent an unpermitted request from entering the Blue environment 310 and the Green environment 350.

The configuration illustrated in FIG. 16 differs from the configuration illustrated in FIG. 3B in that the FW 1611 is added in the Blue environment 310 and the FW 1651 is added in the Green environment 350.

Figure 17:
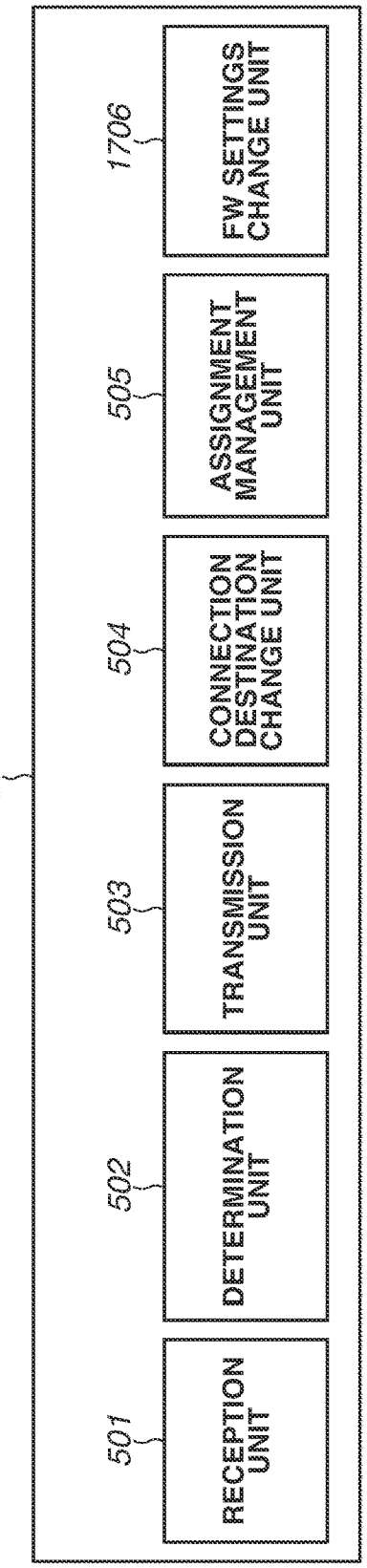
FIG. 17 is a block diagram illustrating an example of a software module configuration of a dispatch server.

FIG. 17 is a block diagram illustrating an example of a software module configuration of the dispatch server 304. The dispatch server 304 includes the reception unit 501, the determination unit 502, the transmission unit 503, the connection destination change unit 504, the assignment management unit 505, and an FW settings change unit 1706. In the present application example, the FW settings change unit 1706 is newly added to the dispatch server 304.

The reception unit 501, the determination unit 502, the transmission unit 503, the connection destination change unit 504, and the assignment management unit 505 are similar to those described above.

The FW settings change unit 1706 instructs the resource manager 303 to change the settings of the FWs 1611 and 1651.

FIG. 18 illustrates an example of a sequence in the processing system switching processing. For other than steps S1805 to S1810, this sequence is similar to the sequence illustrated in FIG. 6, and redundant descriptions thereof will be omitted.

In step S1805, in response to the start instruction in step S602, the FW settings change unit 1706 of the dispatch server 304 instructs the resource manager 303 to change the settings of the FWs 1611 and 1651. This instruction is used to change the settings to reject requests that have not passed through the dispatch server 304 out of requests from the customer manager computer 120 and computers and network devices in the customer environments 130. The FW settings change unit 1706 may instruct the resource manager 303 to change the setting of only the FW 1611. The system manager 300 may instruct the resource manager 303 to change the settings.

In step S1806, the resource manager 303 changes the settings of the FWs 1611 and 1651. This step changes the settings to reject requests that have not passed through the dispatch server 304 out of requests from the customer manager computer 120 and computers and network devices in the customer environments 130. This makes it possible, when the customer manager computer 120 and computers in the customer environments 130 send a request based on the IP address before the record in the DNS 301 is changed, to prevent reception of requests that have not passed through the dispatch server 304 out of requests from the customer manager computer 120 and computers and network devices in the customer environments 130.

Subsequently, in step S1807, the resource manager 303 instructs the dispatch server 304 to start the tenant assignment processing (see FIG. 7) and the determination processing (see FIG. 10). After the resource manager 303 changes the settings of the FWs 1611 and 1651, the reception unit 501 may wait for reception of a request, and, when the reception unit 501 receives a request for the first time, the processing may proceed to step S1708.

In step S1808, the assignment management unit 505 of the dispatch server 304 performs the tenant assignment processing (see FIG. 7). Further, each time the reception unit 501 receives a request, the determination unit 502 of the dispatch server 304 performs the determination processing for determining a processing system that is to process the request.

In step S1809, upon completion of the tenant assignment processing by the assignment management unit 505, the FW settings change unit 1706 of the dispatch server 304 instructs the resource manager 303 to change the settings of the FWs 1611 and 1651. This instruction is used to change the settings to cancel the setting for rejecting requests that have not passed through the dispatch server 304 out of requests from the customer manager computer 120 and computers and network devices in the customer environments 130.

In step S1810, the resource manager 303 changes the settings of the FWs 1611 and 1651. This step changes the settings to cancel the setting for rejecting requests that have not passed through the dispatch server 304 out of requests from the customer manager computer 120 and computers and network devices in the customer environments 130.

In the present application example, it is possible to prevent requests from the customer manager computer 120 and computers in the customer environments 130, not having passed through the dispatch server 304, from being received in the Blue environment 310 or the Green environment 350. This enables preventing a failure in request processing, which occurs when a request is sent to the Blue environment 310 or the Green environment 350 without passing through the dispatch server 304.

In the first and the second exemplary embodiments and in the first, the second, and the third application examples, the complicated dependency relations between the customer manager and customers make it impossible to assign to the Green environment 350 the customer manager and customers in dependency relations simultaneously and collectively in the tenant assignment processing (see FIG. 7). If the customer manager and customers in dependency relations are simultaneously and collectively assigned to the Green environment 350, the assignment management unit 505 will assign not a part of all of tenants of users using the management system 100 but almost all of the tenants of users to the Green environment 350 in single assignment processing. Then, all of requests received by the reception unit 501 in the determination processing of the determination unit 502 are transmitted to the Green environment 350. Therefore, in a case of a large number of requests, processing for the large number of requests may possibly be stagnated. Therefore, in the above-described exemplary embodiments, the customer manager and customers in dependency relations are not simultaneously and collectively assigned to the Green environment 350.

In the present exemplary embodiment, a case is presented where dependency relations between the customer manager and customers are not complicated. An example case where dependency relations between the customer manager and customers are not complicated is a case where one customer manager corresponds to one customer. In the tenant assignment processing (see FIG. 7), by collectively assigning the customer manager and customers in dependency relations, it is possible, even when processing a plurality of requests, to suitably determine a processing system that is to process requests so that no failure occurs in request processing.

The tenant assignment processing in the present exemplary embodiment will be described below with reference to FIG. 7.

FIG. 7 is a flowchart illustrating the tenant assignment processing performed by the assignment management unit 505. The tenant assignment processing according to the present exemplary embodiment is similar to that according to the above-described exemplary embodiments except for the processing in step S702, and redundant descriptions thereof will be omitted.

In step S702, the assignment management unit 505 performs processing for collectively assigning to the Green environment 350 tenants of the customer manager and customers in dependency relations out of all of tenants of the customer manager and customers using the management system 100.

Information about dependency relations between the customer manager and customers is stored in the database 302. When the dispatch server 304 is generated, the assignment management unit 504 may acquire and hold the information from the database 302. Each time the assignment management unit 504 performs the processing in step S702, it may acquire and refer to the information from the database 302. The assignment management unit 504 may acquire the information via the system manager 300.

The determination processing according to the present exemplary embodiment will be described below with reference to FIG. 10.

As described above, in the tenant assignment processing according to the present exemplary embodiment, tenants of the customer manager and customers in dependency relations are collectively assigned, and therefore the transmitting tenant and the related tenant included in a request received by the reception unit 501 are to be assigned to the same processing system. Therefore, the determination unit 502 is able to determine a suitable processing system according to the transmitting tenant assignment without taking the related tenant into consideration. More specifically, steps S1004 to S1007 can be omitted. When a related tenant is included in the request received by the reception unit 501, the determination unit 502 is also able to determine a processing system according to the related tenant assignment without taking the transmitting tenant into consideration.

The present exemplary embodiment is applicable when dependency relations between the customer manager and customers are not complicated. In the tenant assignment processing (see FIG. 7), by collectively assigning the customer manager and customers in dependency relations, it is possible to suitably determine a processing system according to the assignment of only one of a transmitting tenant or a related tenant included in the received request.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-099469, filed May 14, 2015, which is hereby incorporated by reference herein in its entirety.

What is claimed is:

1. A request distribution system connected with a first processing system and a second processing system and capable of adjusting resources to be used in request processing according to an amount of requests received, the request distribution system comprising:

a memory storing instructions; and a processor that, when executing the instructions, causes the request distribution system to perform operations including:

specifying information indicating a part of users out of a plurality of users belonging to a predetermined network system as specification information for determining a processing system as a transmission destination, wherein processing for specifying the information indicating a part of users out of the plurality of users is repetitively performed at intervals of a predetermined time period, receiving a request, determining a processing system as the transmission destination of the received request, and transmitting the received request to the determined processing system, wherein, when a processing system for processing a request from a predetermined network system is switched in a switching from the first processing system to the second processing system, according to identification information included in each request and the information that has been specified when the each request is received, the second processing system is determined as a transmission destination of a part of a plurality of requests during a time period between a start and an end of the relevant switching, wherein, during the time period between the start and the end of the relevant switching, the first processing system is determined as a transmission destination of requests other than the part of the plurality of requests, and wherein resources to be used in request processing by the second processing system are adjusted according to the amount of requests of which the transmission destination is determined to be the second processing system.

2. The request distribution system according to claim 1, wherein, when a first request including first identification information as information of a requestor is received, the second processing system is determined as a transmission destination of the first request, and wherein, when a second request including the first identification information as information of other than the requestor is further received, the second processing system is determined as a transmission destination of the second request.

3. The request distribution system according to claim 1, wherein, even in a case where second identification information included as information of a requestor in a request is not specified as the specified information, the second processing system is determined as a transmission destination of the request when the request includes first identification information that is different from the second identification information and specified as the specified information.

4. The request distribution system according to claim 1, wherein, when an instruction for starting the switching is received by the request distribution system, processing for specifying a part of information indicating the plurality of users is started.

5. The request distribution system according to claim 1, wherein, when a request is received for the first time after an instruction for starting the switching is received by the request distribution system, processing for specifying a part of information indicating the plurality of users is started.

6. The request distribution system according to claim 1, wherein the processing for specifying the information indicating a part of users out of the plurality of users is performed until information indicating all of the plurality of users is specified.

7. The request distribution system according to claim 1, wherein the first and the second processing systems are each configured with one or more virtual machines as resources offered by one or more server computers, and wherein the resource adjustment includes a change in a number of virtual machines according to the amount of requests from the predetermined network system or a load for processing the requests.

8. The request distribution system according to claim 1, wherein the second processing system is a processing system for handling data that cannot be handled by the first processing system in processing the request from the predetermined network system.

9. The request distribution system according to claim 1, wherein, in response to the end of the relevant switching, all of further received requests are transmitted to the second processing system without depending on identification information included in each request.

10. A management system including a first processing system and a second processing system and capable of adjusting resources to be used in request processing, the management system comprising:

a memory storing instructions related to a server; and a processor that, when executing the instructions, causes the management system to perform operations including:

specifying information indicating a part of users out of a plurality of users belonging to a predetermined network system as specification information for determining a processing system as a transmission destination, wherein processing for specifying the information indicating a part of users out of the plurality of users is repetitively performed at intervals of a predetermined time period, receiving a request by the server, determining a processing system as the transmission destination of the received request, and transmitting the received request to the determined processing system, wherein, when a processing system for processing a request from a predetermined network system is switched in a switching from the first processing system to the second processing system according to identification information included in each request and the information that has been specified when the each request is received, the second processing system is determined as a transmission destination of a part of a plurality of requests during a time period between a start and an end of the relevant switching, wherein during the time period between the start and the end of the relevant switching, the first processing system is determined as a transmission destination of requests other than the part of the plurality of requests, and wherein resources to be used in request processing by the second processing system are adjusted according to an amount of requests of which the transmission destination is determined to be the second processing system.

11. The management system according to claim 10, wherein executing the instructions further causes the management system to perform operations including making an instruction to specify a connection destination, wherein, according to a request for starting the switching for the management system, an instruction to specify the server as a connection destination of the request after the server is generated.

12. The management system according to claim 11, wherein executing the instructions further causes the management system to perform operations including specifying information indicating a part of users out of a plurality of users belonging to the predetermined network system as specification information for determining a processing system as a transmission destination, and wherein, during the time period between the start and the end of the relevant switching, a processing system as a transmission destination of the request is determined according to identification information included in the request and the specified information.

13. The management system according to claim 12, wherein, after information indicating all of the plurality of users using the management system is specified as the specified information, the server is deleted.

14. A method for controlling a request distribution system connected with a first processing system and a second processing system and capable of adjusting resources to be used in request processing according to an amount of requests received, the method comprising:
- specifying information indicating a part of users out of a plurality of users belonging to a predetermined network system as specification information for determining a processing system as a transmission destination, wherein processing for specifying the information indicating a part of users out of the plurality of users is repetitively performed at intervals of a predetermined time period;
- receiving a request;
- determining a processing system as the transmission destination of the received request; and
- transmitting the received request to the determined processing system,
- wherein, when a processing system for processing a request from a predetermined network system is switched in a switching from the first processing system to the second processing system according to identification information included in each request and the information that has been specified when the each request is received, the second processing system is determined as a transmission destination of a part of a plurality of requests during a time period between a start and an end of the relevant switching,
- wherein, during the time period between the start and the end of the relevant switching, the first processing system is determined as a transmission destination of requests other than the part of the plurality of requests, and
- wherein resources to be used in request processing by the second processing system are adjusted according to the amount of requests of which the transmission destination is determined to be the second processing system.

15. The control method according to claim 14, wherein, during a time period between the start and the end of the relevant switching, determining includes determining the second processing system as a transmission destination corresponding to a part of the received plurality of requests, and determining the first processing system as a transmission destination of requests other than the part of the received plurality of requests.

16. The control method according to claim 14, wherein, for the received request and during a time period between the start and the end of the relevant switching, determining includes determining a processing system as a transmission destination of the request according to identification information included in the request.

17. The control method according to claim 14, further comprising specifying information indicating a part of users out of a plurality of users belonging to the predetermined network system as specification information for determining a processing system as a transmission destination of the request,
- wherein, for the received request and during a time period between the start and the end of the relevant switching, determining includes determining a processing system as a transmission destination of the request according to identification information included in the request and the specification.

18. A method for controlling a management system including a first processing system and a second processing system and capable of adjusting resources to be used in request processing, the method comprising:
- specifying information indicating a part of users out of a plurality of users belonging to a predetermined network system as specification information for determining a processing system as a transmission destination, wherein processing for specifying the information indicating a part of users out of the plurality of users is repetitively performed at intervals of a predetermined time period;
- receiving a request by the server;
- determining a processing system as the transmission destination of the received request; and
- transmitting the received request to the determined processing system,
- wherein, when a processing system for processing a request from a predetermined network system is switched in a switching from the first processing system to the second processing system according to identification information included in each request and the information that has been specified when the each request is received, the second processing system is determined as a transmission destination of a part of a plurality of requests during a time period between a start and an end of the relevant switching,
- wherein, during the time period between the start and the end of the relevant switching, the first processing system is determined as a transmission destination of requests other than the part of the plurality of requests, and
- wherein resources to be used in request processing by the second processing system are adjusted according to an amount of requests of which the transmission destination is determined to be the second processing system.

* * * * *